(12) United States Patent
Wegerich et al.

(10) Patent No.: US 6,775,641 B2
(45) Date of Patent: Aug. 10, 2004

(54) GENERALIZED LENSING ANGULAR SIMILARITY OPERATOR

(75) Inventors: Stephan W. Wegerich, Glendale Heights, IL (US); R. Matthew Pipke, Oak Park, IL (US); Andre Wolosewicz, Woodridge, IL (US)

(73) Assignee: SmartSignal Corporation, Lisle, IL (US)

( * ) Notice: Subject to any disclaimer, the term of this patent is extended or adjusted under 35 U.S.C. 154(b) by 304 days.

(21) Appl. No.: 09/802,482

(22) Filed: Mar. 9, 2001

(65) Prior Publication Data

US 2002/0091499 A1 Jul. 11, 2002

Related U.S. Application Data

(60) Provisional application No. 60/188,102, filed on Mar. 9, 2000.

(51) Int. Cl.[7] .............................. G06F 11/30; G06F 17/16
(52) U.S. Cl. ............................................ 702/183; 703/2
(58) Field of Search ................................ 702/183, 185, 702/179; 700/30; 714/736; 703/2, 9; 712/7, 2

(56) References Cited

U.S. PATENT DOCUMENTS

| | | |
|---|---|---|
| 3,045,221 A | 7/1962 | Roop |
| 4,336,595 A | 6/1982 | Adams et al. |
| RE31,750 E | 11/1984 | Morrow |
| 4,480,480 A | 11/1984 | Scott et al. |
| 4,639,882 A | 1/1987 | Keats |
| 4,707,796 A | 11/1987 | Calabro et al. |
| 4,761,748 A | 8/1988 | Le Rat et al. |
| 4,796,205 A | 1/1989 | Ishii et al. |
| 4,823,290 A | 4/1989 | Fasack et al. |
| 4,841,456 A | 6/1989 | Hogan, Jr. et al. |
| 4,937,763 A | 6/1990 | Mott |
| 5,003,950 A | 4/1991 | Kato et al. |
| 5,025,499 A | 6/1991 | Inoue et al. |
| 5,052,630 A | 10/1991 | Hinsey et al. |
| 5,067,099 A * | 11/1991 | McCown et al. ........... 702/183 |
| 5,093,792 A | 3/1992 | Taki et al. |
| 5,113,483 A | 5/1992 | Keeler et al. |
| 5,119,287 A | 6/1992 | Nakamura et al. |
| 5,123,017 A | 6/1992 | Simpkins et al. |

(List continued on next page.)

FOREIGN PATENT DOCUMENTS

| | | | |
|---|---|---|---|
| EP | 0840244 A1 | 6/1998 | ........... G06F/17/60 |
| WO | WO 97/22073 | 6/1997 | ........... G06F/17/60 |

OTHER PUBLICATIONS

Keller, May 1994, "Three Neural Network Based, Sensor Systems for Environmental Monitoring", p377–382.*

Rajan et al, Jan. 1998; "Machine Learning Algorithm for Fault Diagnosis in Analog Circuits", p1874–1879.*

"MSET Modeling Of Crystal River–3 Venturi Flow Meters" by J. P. Herzog, S. W. Wegerich, K. C. Gross, and F. K. Bockhorst, 6th International Conference on Nuclear Engineering, ICONE–6169, May 10–14, 1998, Copyright© 1998 ASME (12 pp).

(List continued on next page.)

*Primary Examiner*—Marc S. Hoff
*Assistant Examiner*—Paul L Kim
(74) *Attorney, Agent, or Firm*—Michael Best & Friedrich LLP

(57) ABSTRACT

In a machine for monitoring an instrumented process or for analyzing one or more signals, an empirical modeling module for modeling non-linearly and linearly correlated signal inputs using a non-linear angular similarity function with variable sensitivity across the range of a signal input. A different angle-based similarity function can be chosen for different inputs for improved sensitivity particular to the behavior of that input. Sections of interest within a range of a signal input can be lensed for particular sensitivity.

21 Claims, 26 Drawing Sheets

U.S. PATENT DOCUMENTS

| | | | |
|---|---|---|---|
| 5,187,735 A | 2/1993 | Herrero Garcia et al. | 379/21 |
| 5,195,046 A | 3/1993 | Gerardi et al. | |
| 5,210,704 A | 5/1993 | Husseiny | |
| 5,223,207 A | 6/1993 | Gross et al. | |
| 5,239,462 A | 8/1993 | Jones et al. | 705/38 |
| 5,251,285 A | 10/1993 | Inoue et al. | |
| 5,262,941 A | 11/1993 | Saladin et al. | 705/28 |
| 5,285,494 A | 2/1994 | Sprecher et al. | |
| 5,311,562 A | 5/1994 | Palusamy et al. | |
| 5,327,349 A | 7/1994 | Hoste | |
| 5,386,373 A | 1/1995 | Keeler et al. | |
| 5,387,783 A | 2/1995 | Mihm et al. | 235/375 |
| 5,420,571 A | 5/1995 | Coleman et al. | |
| 5,421,204 A | 6/1995 | Svaty, Jr. | |
| 5,446,672 A | 8/1995 | Boldys | |
| 5,450,537 A | 9/1995 | Hirai et al. | 395/149 |
| 5,455,777 A | 10/1995 | Fujiyama et al. | |
| 5,459,675 A | 10/1995 | Gross et al. | |
| 5,481,647 A | 1/1996 | Brody et al. | |
| 5,495,168 A | 2/1996 | de Vries | |
| 5,500,940 A | 3/1996 | Skeie | |
| 5,502,543 A | 3/1996 | Aboujaoude | |
| 5,539,638 A | 7/1996 | Keeler et al. | |
| 5,548,528 A | 8/1996 | Keeler et al. | |
| 5,553,239 A | 9/1996 | Heath et al. | |
| 5,586,066 A | 12/1996 | White et al. | |
| 5,600,726 A | 2/1997 | Morgan et al. | |
| 5,611,052 A | 3/1997 | Dykstra et al. | 705/38 |
| 5,629,878 A | 5/1997 | Kobrosly | |
| 5,638,413 A | 6/1997 | Uematsu et al. | |
| 5,657,245 A | 8/1997 | Hecht et al. | |
| 5,663,894 A | 9/1997 | Seth et al. | |
| 5,668,944 A | 9/1997 | Berry | |
| 5,671,635 A | 9/1997 | Nadeau et al. | |
| 5,680,409 A | 10/1997 | Qin et al. | |
| 5,682,317 A | 10/1997 | Keeler et al. | |
| 5,696,907 A | 12/1997 | Tom | 705/38 |
| 5,699,403 A | 12/1997 | Ronnen | |
| 5,704,029 A | 12/1997 | Wright, Jr. | 395/149 |
| 5,708,780 A | 1/1998 | Levergood et al. | |
| 5,710,723 A | 1/1998 | Hoth et al. | |
| 5,727,144 A | 3/1998 | Brady et al. | |
| 5,727,163 A | 3/1998 | Bezos | 395/227 |
| 5,745,654 A | 4/1998 | Titan | 395/22 |
| 5,748,469 A | 5/1998 | Pyötsiä | |
| 5,757,309 A | 5/1998 | Brooks et al. | |
| 5,761,090 A | 6/1998 | Gross et al. | |
| 5,761,640 A | 6/1998 | Kalyanswamy et al. | 704/260 |
| 5,764,509 A | 6/1998 | Gross et al. | |
| 5,774,379 A | 6/1998 | Gross et al. | |
| 5,774,882 A | 6/1998 | Keen et al. | 705/38 |
| 5,774,883 A | 6/1998 | Andersen et al. | 205/38 |
| 5,784,285 A | 7/1998 | Tamaki et al. | |
| 5,787,138 A | 7/1998 | Ocieczek et al. | |
| 5,790,977 A | 8/1998 | Ezekiel | |
| 5,796,633 A | 8/1998 | Burgess et al. | |
| 5,797,133 A | 8/1998 | Jones et al. | 705/38 |
| 5,819,029 A | 10/1998 | Edwards et al. | 395/186 |
| 5,819,236 A | 10/1998 | Josephson | 705/35 |
| 5,819,291 A | 10/1998 | Haimowitz et al. | 707/201 |
| 5,822,212 A | 10/1998 | Tanaka et al. | |
| 5,832,465 A | 11/1998 | Tom | 706/51 |
| 5,845,230 A | 12/1998 | Lamberson | |
| 5,864,773 A | 1/1999 | Barna et al. | |
| 5,870,721 A | 2/1999 | Norris | 705/38 |
| 5,878,403 A | 3/1999 | DeFrancesco et al. | 705/38 |
| 5,886,913 A | 3/1999 | Marguinaud et al. | |
| 5,895,177 A | 4/1999 | Iwai et al. | |
| 5,905,989 A | 5/1999 | Biggs | |
| 5,909,368 A | 6/1999 | Nixon et al. | |
| 5,911,135 A | 6/1999 | Atkins | 705/36 |
| 5,913,911 A | 6/1999 | Beck et al. | |
| 5,930,776 A | 7/1999 | Dykstra et al. | 705/38 |
| 5,930,779 A | 7/1999 | Knoblock et al. | |
| 5,933,352 A | 8/1999 | Salut | |
| 5,933,818 A | 8/1999 | Kasravi et al. | |
| 5,940,811 A | 8/1999 | Norris | 705/38 |
| 5,940,812 A | 8/1999 | Tengel et al. | 705/38 |
| 5,950,179 A | 9/1999 | Buchanan et al. | 705/38 |
| 5,960,411 A | 9/1999 | Hartman et al. | 705/26 |
| 5,963,884 A | 10/1999 | Billington et al. | |
| 5,966,699 A | 10/1999 | Zandi | 705/38 |
| 5,970,430 A | 10/1999 | Burns et al. | |
| 5,970,478 A | 10/1999 | Walker et al. | 705/35 |
| 5,987,399 A | 11/1999 | Wegerich et al. | |
| 5,987,434 A | 11/1999 | Libman | 705/36 |
| 5,995,916 A | 11/1999 | Nixon et al. | |
| 5,995,947 A | 11/1999 | Fraser et al. | 705/36 |
| 6,000,832 A | 12/1999 | Franklin et al. | 364/479.02 |
| 6,006,260 A | 12/1999 | Barrick, Jr. et al. | |
| 6,014,645 A | 1/2000 | Cunningham | 705/38 |
| 6,023,507 A | 2/2000 | Wookey | |
| 6,026,348 A | 2/2000 | Hala | |
| 6,029,149 A | 2/2000 | Dykstra et al. | 705/38 |
| 6,029,890 A | 2/2000 | Austin | 235/380 |
| 6,049,827 A | 4/2000 | Sugauchi et al. | |
| 6,076,088 A | 6/2000 | Paik et al. | |
| 6,088,686 A | 7/2000 | Walker et al. | 705/38 |
| 6,104,965 A | 8/2000 | Lim et al. | |
| 6,105,007 A | 8/2000 | Norris | 705/38 |
| 6,112,190 A | 8/2000 | Fletcher et al. | 705/38 |
| 6,128,543 A | 10/2000 | Hitchner | |
| 6,202,038 B1 * | 3/2001 | Wegerich et al. | 702/183 |
| 6,418,431 B1 * | 7/2002 | Mahajan et al. | 707/4 |

OTHER PUBLICATIONS

"Application Of A New Technique For Modeling System Behavior" by Paul J. O'Sullivan, presented at the ISA Symposium, Edmonton, Alberta, May 1, 1991, © Copyright 1991 Instrument Society of America (21 pp.).

"A Universal, Fault–Tolerant, Non–Linear Analytic Network For Modeling And Fault Detection," by J. E. Mott, R. W. King, L. R. Monson, D. L. Olson, and J. D. Staffon, Proceedings of the 8th Power Plant Dynamics, Control & Testing Symposium, Knoxville, Tennessee, May 27–29, 1992 (14 pp.).

ModelWare™ Product Review by Robert D. Flori, reprinted from Computerized Investing, Sep./Oct. 1992, vol. XI, No. 5, copyright by The American Association of Individual Investors (pp. 8–10).

ModelWare™ A New Approach to Prediction by Ken Tucker, reprinted from PC AI magazine, Jan./Feb. 1993, pp. 14, 15, 30.

"Similarity Based Regression: Applied Advanced Pattern Recognition for Power Plant Analysis," by E. J. Hansen and M. B. Caudill, presented at the 1994 EPRI Heat Rate Improvement Conference (9 pp.).

"Applied Pattern Recognition For Plant Monitoring And Data Validation," by Ron Griebenow, E. J. Hansen, and A. L. Sudduth, presented at the Fifth International Joint ISA POWID/EPRI Controls and Instrumentation Conference, La Jolla, California, Jun. 19–21, 1995 (11 pp.).

"Model–Based Nuclear Power Plant Monitoring And Fault Detection: Theoretical Foundations," by Ralph M. Singer, Kenny C. Gross, James P. Herzog, Ronald W. King, and Stephan Wegerich, presented at the International Conference on Intelligent System Application to Power Systems (ISAP '97), Jul. 6–10, 1997, Seoul, Korea (pp. 60–65).

"Application Of A Model–Based Fault Detection System To Nuclear Plant Signals," by K. C. Gross, R. M. Singer, S. W. Wegerich, J. P. Herzog, R. VanAlstine, and F. Bockhorst, presented at the International Conference on Intelligent System Application to Power Systems (ISAP '97), Jul. 6–10, 1997, Seoul, Korea (pp. 66–70).

Anon. Microsoft targets more than PIM market with Outlook 2000, Computer Reseller News, n. 805, p. 99, Aug. 31, 1998.

Anon. "To Boost Balances, AT&T Renews No–Fee Universal Card Offer", The Gale Group, v. 10, n. 13, Mar. 30, 1992.

Anon. "Citgo puts a new spin on the cobranded oil card" Credit Card news, p. 4, Nov. 1, 1995.

Altavista: search, FICO, http://www.altavista.com.

Block, Valerie, "Network Assembles Card Issuers at an Internet Site," American Banker, vol. 160, No. 198, p. 11, Oct. 13, 1995.

Borowsky, Mark, "The Neural Net: Predictor of Fraud or Victim of Hype?", Bank Technology News, p. 7, Sep. 1993.

Calvey, Mark, "Internet Gives Bankers a Snappy Comeback", San Francisco Business Times, vol. 13, No. 5, p. 3, Sep. 1998.

Canter, Ronald S., "Lender Beware–Federal Regulation of Consumer Credit", Credit World, vol. 81, No. 5, pp. 16–20, May 1993.

Chesanow, Neil, "Pick the Right Credit Cards–and Use Them Wisely", Medical Economics, v. 75, n. 16, p. 94, Aug. 24, 1998.

Creditnet.com–An Online Guide to Credit Cards; http://www.creditnet.com/consumers.html.

"Credit", The New Encyclopedia Britannica.

FICO http/houseloans.ids.com/fico.

Duclaux, Denise, "A Check for $5,000 in Ten Minutes", ABA Banking Journal, vol. 87, No. 8, p. 45, Aug. 1995.

FIData, Inc., Press Release, Aug. 26, 1998, http://fidata–inc.com.

Friedland, Marc, "Credit Scoring Digs Deeper into Data", Credit World, v. 84, n. 5, p. 19–23, May 1996.

Handley, John, "Credit Review Lets the Numbers Do the Talking in Home Mortgage Game", Chicago Tribune, Jul. 1998.

Hollander, Geoffrey, "Sibling Tool Personator 3 Untangles File Formats", InfoWorld, b 20 No. 5, pp. 102, Feb. 2, 1998.

Kantrow, Yvette D., "Banks Press Cardholders to Take Cash Advances", American Banker, b 157, n. 18, p. 1–2, Jan. 28, 1992.

Lotus News Release: "Lotus Delivers Pre–Release of Lotus Notes 4.6 Client Provides Compelling New Integration with Internet Explorer", May 20, 1997.

"Low–Rent Loan Officer In a Kiosk", Bank Technology News, vol. 8, No. 2, p. 5, Feb. 1995.

McCormick, Linda W., "Users of Credit Scoring Face Tough Rules on Notification", American Banker, p. 1 May 21, 1982.

McShane, Peter K., "Got Financing?", Business Journal Serving Southern Tier, vol. 11, Issue 19, p 9.

"Phillips 66 Introduces Mastercard with Rebate Feature", PR Newswire, Sep. 14, 1995.

Sherman, Lee, "Wells Fargo Writes a New Online Script", Interactibe Week, vol. 5, No. 31, p. 29, Aug. 1998.

Staff, "On–Line System Approves Loans While Customer Waits", Communication News, vol. 31, No. 9, Sep. 1994.

Stetenfeld, Beth, "Credit scoring: Finding the Right Recipe", Credit Union Management, v 17, n. 11, p. 24–26, Nov. 1994.

"Wells Fargo Launches First Real–Time, Online Home Equity Credit Decision–Making Service", Business Wire, Jun. 1998, Dialog File 621:New Product Announcement.

"What Do FICO Credit Scores Mean to Me?", http://www.sancap.com.

"What is a FICO Score?", http://www.aspenloan.com.

"What the Credit Bureau is Saying About you:", Changing Times, v. 37, p. 56, Jul. 1983.

"World Wide Web Enhances Customer's Choice", Cards International, No. 143, p. 9, Nov. 1995.

* cited by examiner

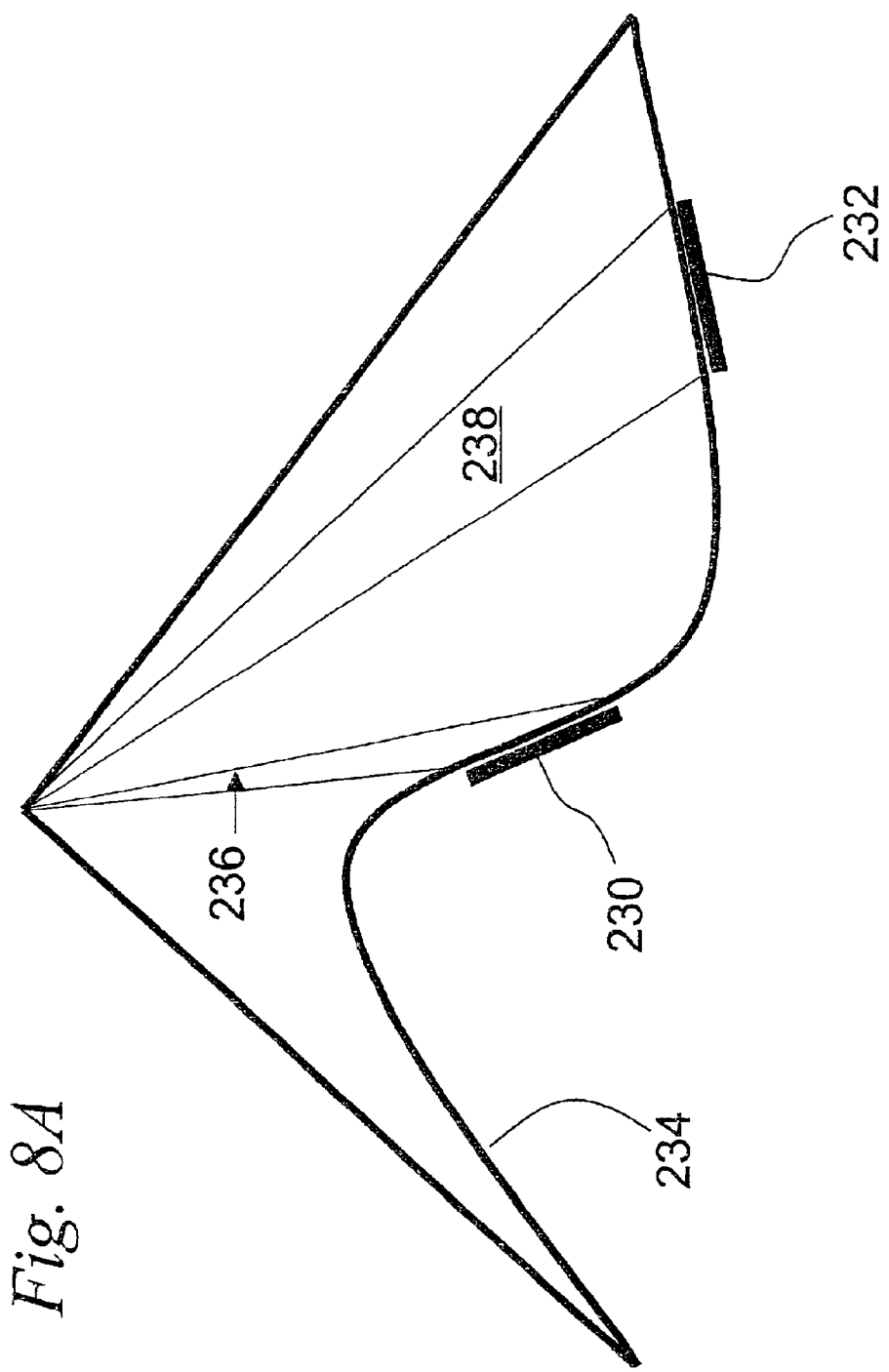

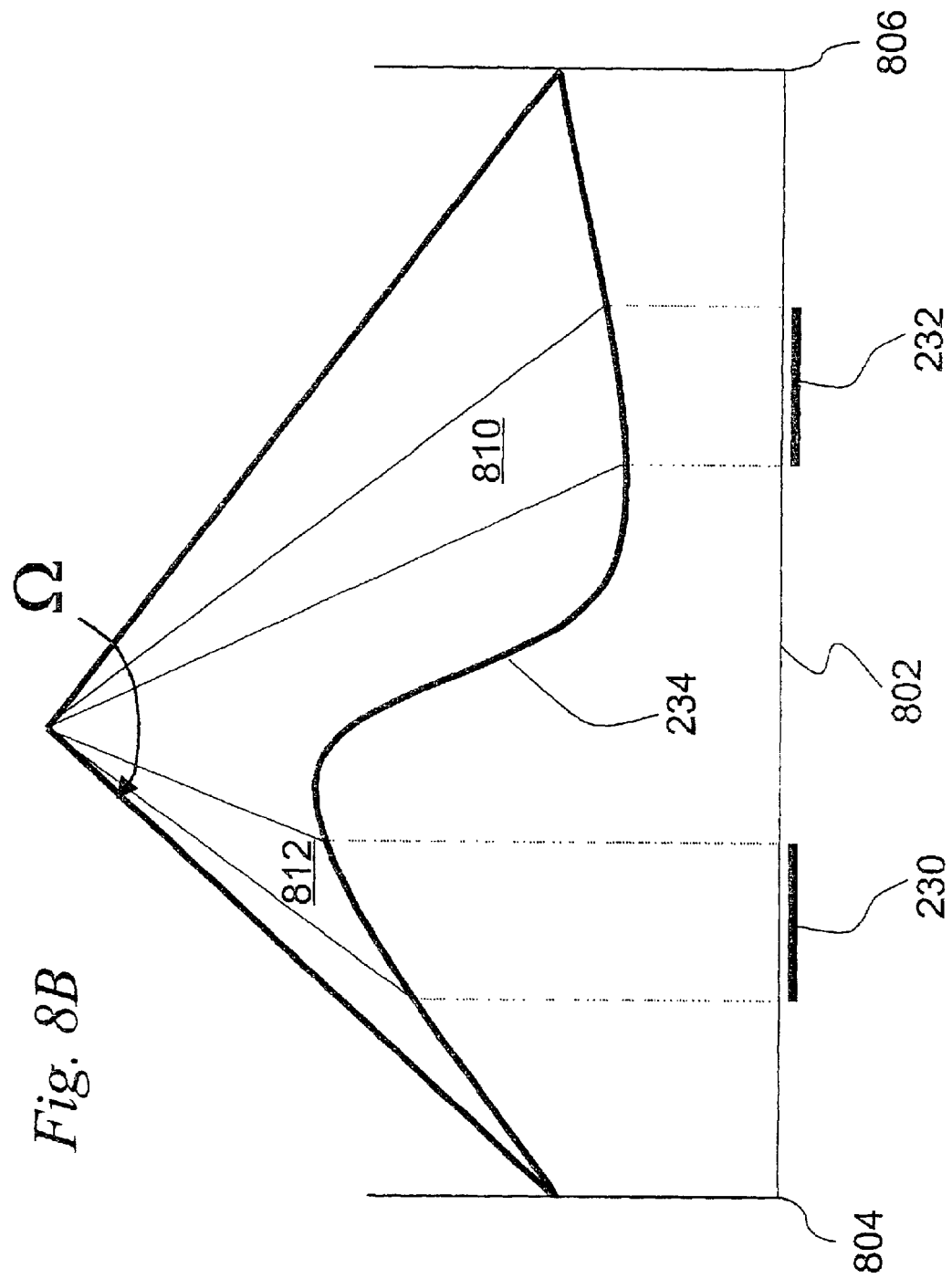

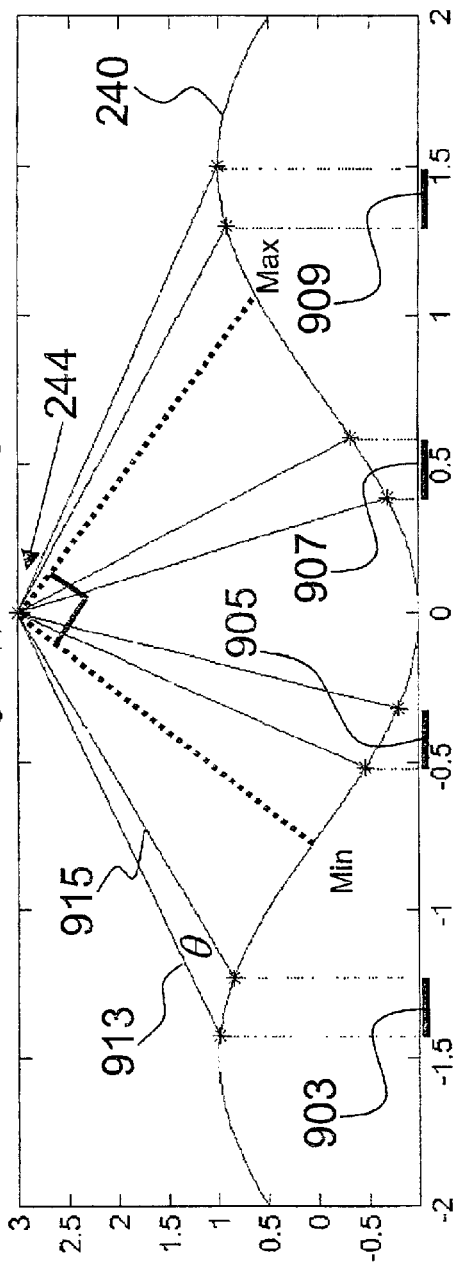
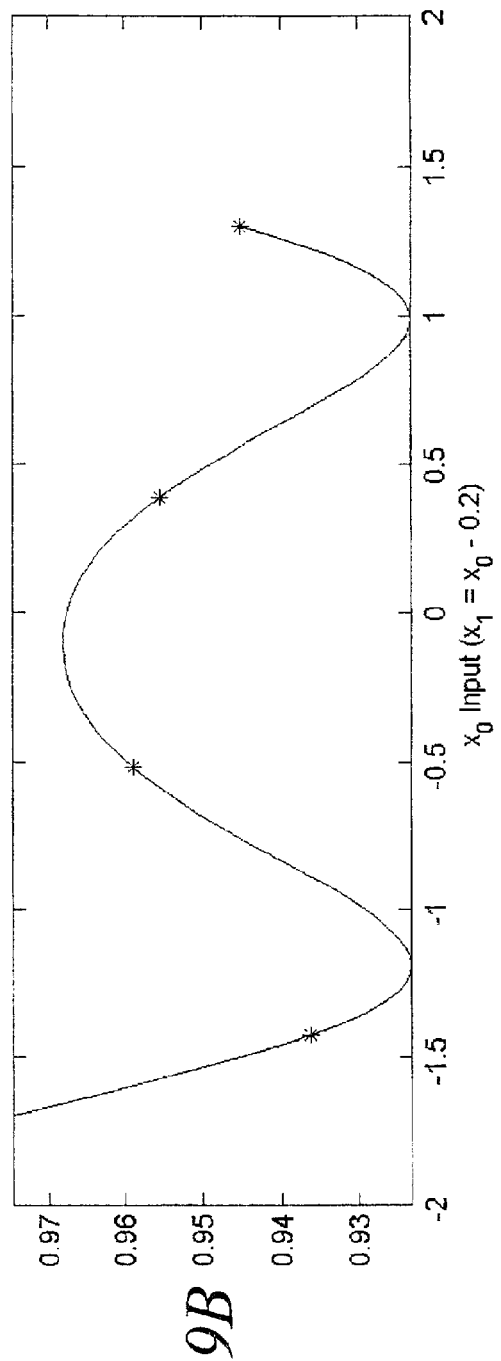
Fig. 9A
Fig. 9B

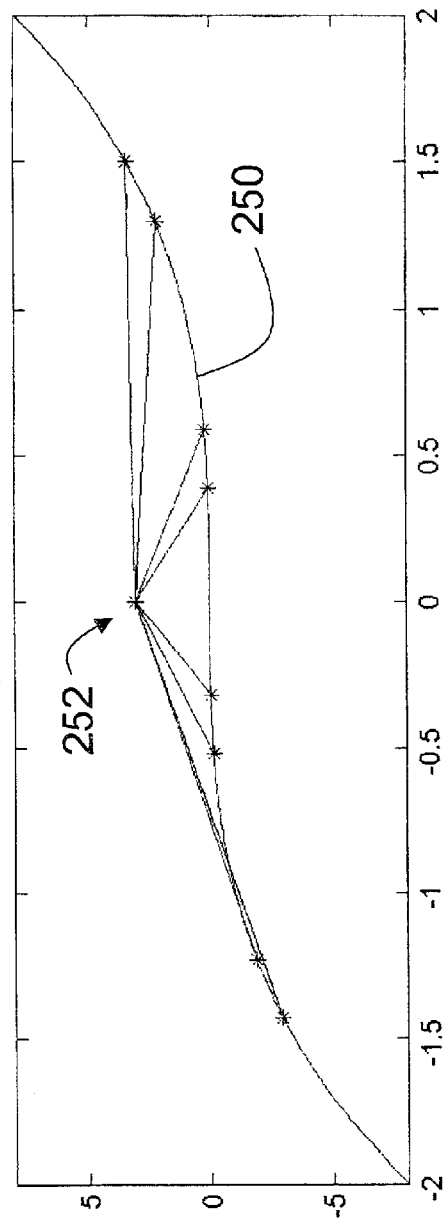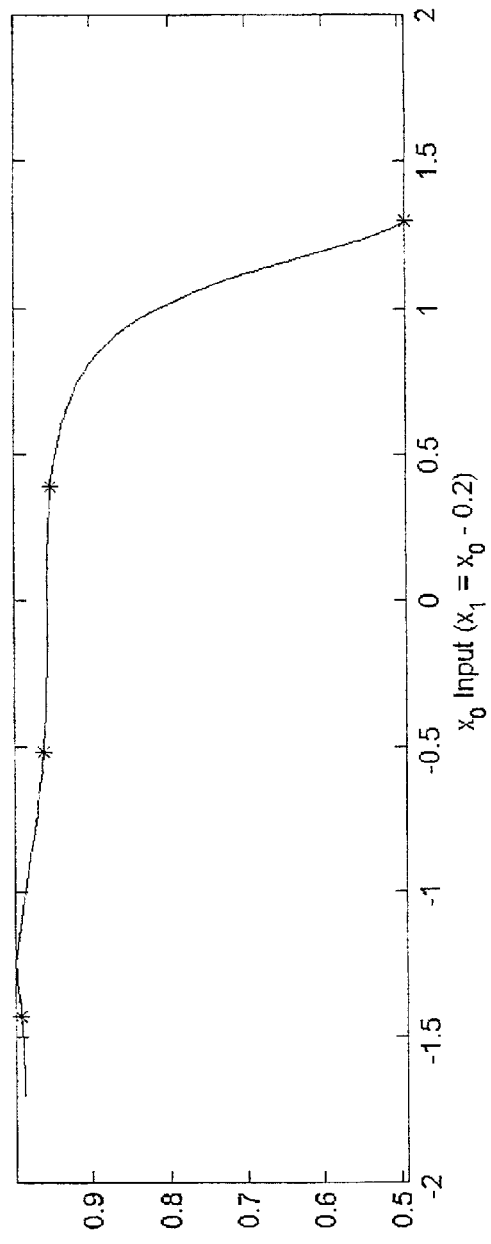
Fig. 10A
Fig. 10B

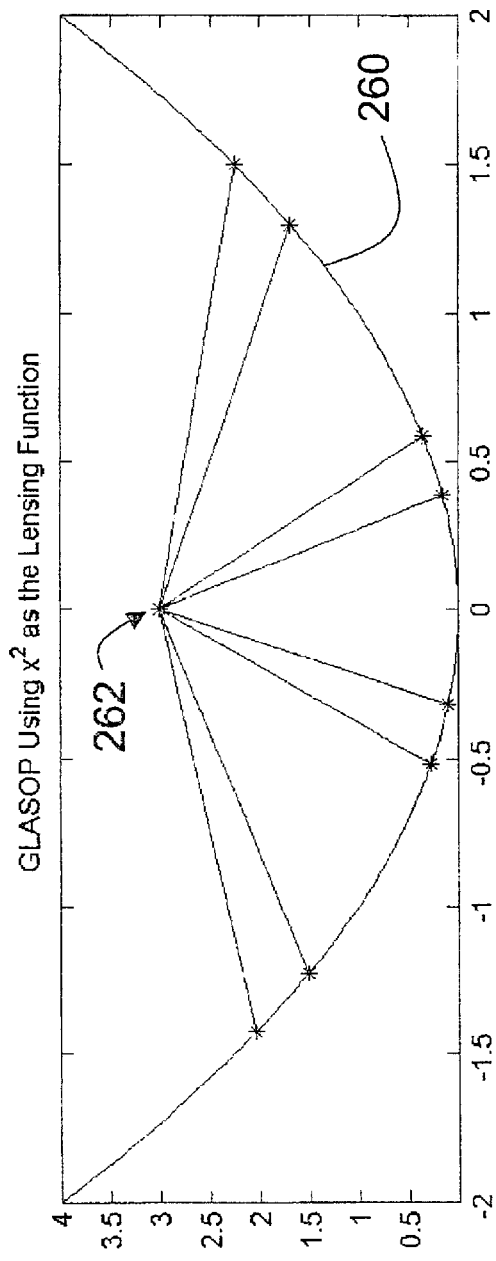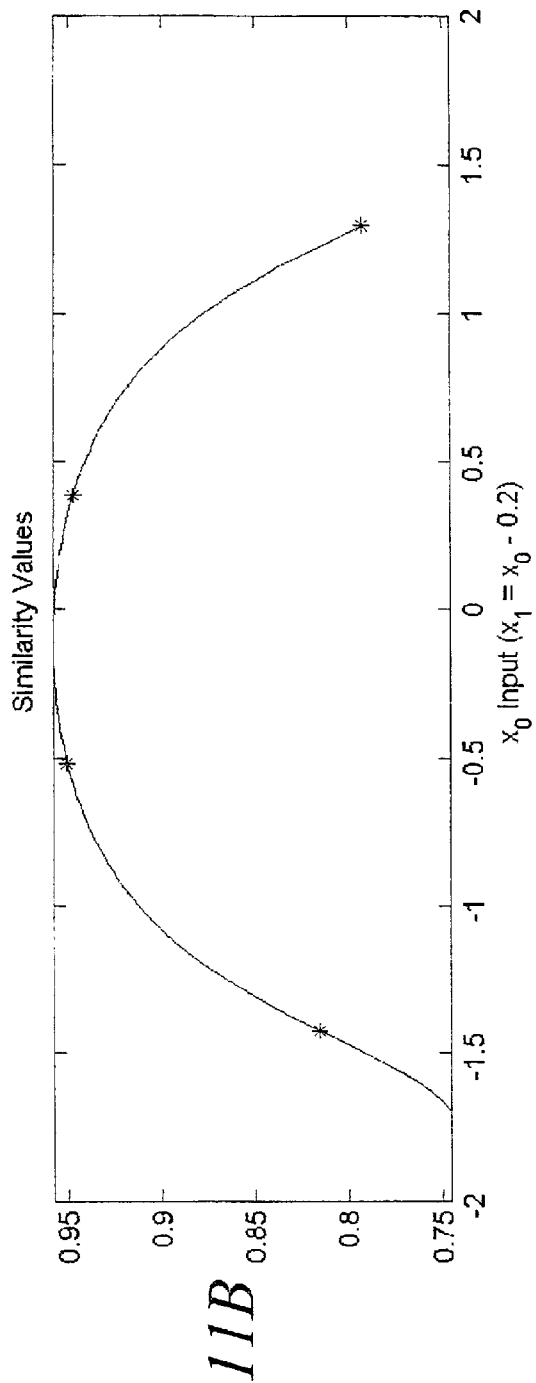
Fig. 11A
Fig. 11B

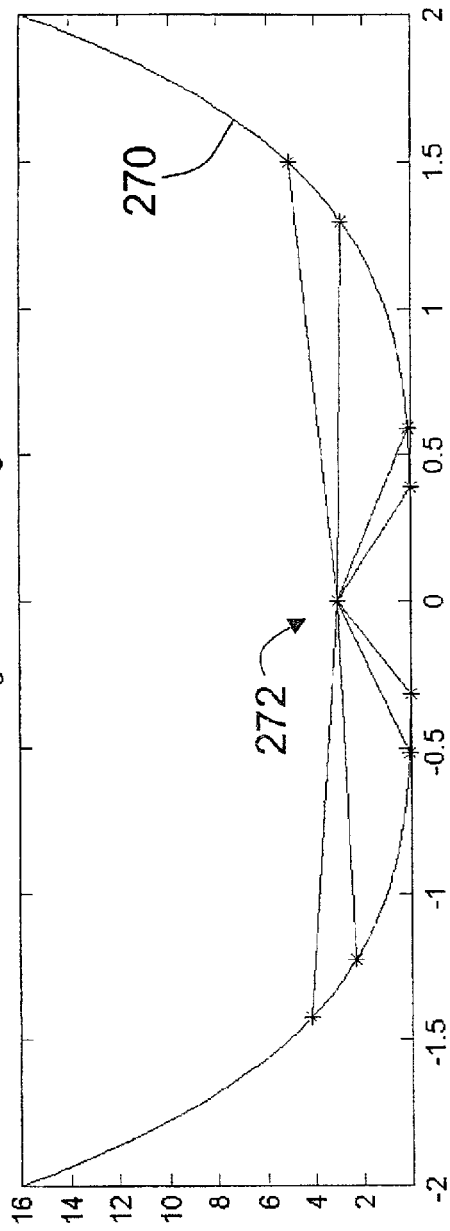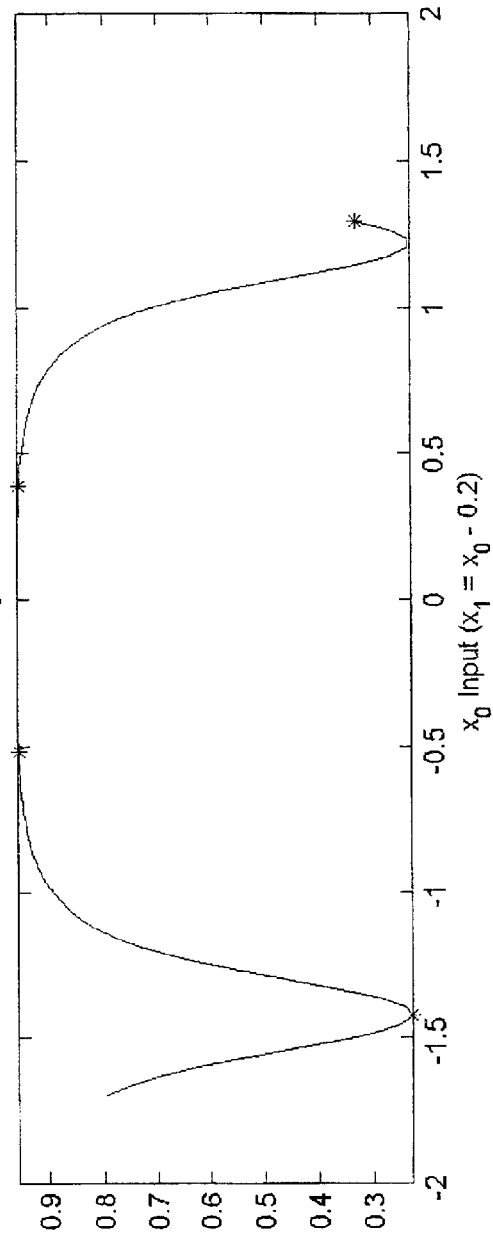
Fig. 12A
Fig. 12B

GENERALIZED LENSING ANGULAR SIMILARITY OPERATOR

CROSS REFERENCE TO RELATED APPLICATIONS

This application claims the benefit of priority under 35 U.S.C. § 119(e) to U.S. Provisional application serial No. 60/188,102 filed Mar. 9, 2000.

BACKGROUND OF THE INVENTION

1. Field of the Invention

The present invention relates generally to equipment and process monitoring, and more particularly to monitoring systems instrumented with sensors that measure correlated phenomena. The present invention further relates to modeling instrumented, real-time processes using the aggregate sensor information to ascertain information about the state of the process.

2. Description of the Related Art

Conventional methods are known for monitoring equipment or processes —generically "systems"—using sensors to measure operational parameters of the system. The data values from sensors can be observed directly to understand how the system is functioning. Alternatively, for unattended operation, it is known to compare sensor data values against stored or predetermined thresholds in an automated fashion, and generate an exception condition or alarm requiring human intervention only when a sensor datum value exceeds a corresponding threshold.

A number of problems exist with monitoring systems using thresholds. One problem is the difficulty of selecting a threshold for a dynamic parameter that avoids a burdensome number of false alarms, yet catches real alarms and provides sufficient warning to take corrective action when a system parameter—as measured by a sensor—moves outside of acceptable operation. Another problem is posed by sensor failure, which may result in spurious parameter values. It may not be clear from a sensor data value that the sensor has failed. Such a failure can entirely undermine monitoring of the subject system.

In systems with a plurality of sensors measuring correlated phenomena in the system, it is known to use certain methods to consider all sensors in aggregate to overcome some of these problems. By observing the behavior of all the sensor data values in aggregate, it can be possible to dramatically improve monitoring without suffering unduly from false and missed alarms. Also, knowledge of how all the correlated parameters behave in unison can help determine that a sensor has failed, when isolated monitoring of data from that sensor in and of itself would not indicate the sensor failure.

Known methods for viewing aggregate sensor data typically employ a modeling function that embodies prior knowledge of the system. One such technique known as "first-principles" modeling requires a well-defined mathematical description of the dynamics of the system, which is used as a reference against which current aggregate sensor data can be compared to view nascent problems or sensor failures. However, this technique is particularly vulnerable to even the slightest structural change in the observed system. The mathematical model of the system is often very costly to obtain, and in many cases, may not be reasonably possible at all.

Another class of techniques involves empirically modeling the system as a "black box" without discerning any specific mechanics within the system. System modeling using such techniques can be easier and more resilient in the face of structural system changes. Modeling in these techniques typically involves providing some historic sensor data corresponding to desired or normal system operation, which is then used to "train" the model.

One particular technique is described in U.S. Pat. No. 5,987,399, the teachings of which are incorporated herein by reference. As taught therein, sensor data is gathered from a plurality of sensors measuring correlated parameters of a system in a desired operating state. This historical data is used to derive an empirical model comprising certain acceptable system states. Real-time sensor data from the system is provided to a modeling engine embodying the empirical model, which computes a measure of the similarity of the real-time state to all prior known acceptable states in the model. From that measure of similarity, an estimate is generated for expected sensor data values. The real-time sensor data and the estimated expected sensor data are compared, and if there is a discrepancy, corrective action can be taken.

The bounded area ratio test (BART) as taught in U.S. Pat. No. 5,987,399, is a well known state of the art similarity operator, wherein an angle is used to gauge the similarity of two values. The similarity operator is insensitive to variations across the training set range of the particular signal or sensor. BART uses the sensor range of values from low to high across all snapshots in the training set to form the hypotenuse of a triangle—preferably a right triangle— which is its base. BART, therefore, forms a straight line with minimum and maximum expected values disposed at either end. During system monitoring, BART periodically maps two points representative of an expected and a parameter value onto the base. These two points are placed, according to their values, within the range of values in the training set. A comparison angle is formed at the apex, opposite the base, by drawing a line to the apex from each of the points and the angle is the basis by which two values are compared for similarity. Furthermore, BART typically locates the apex point at a point above the median or mean of the range, and at a height that provides a right angle at the apex (for easy computation).

BART does not exhibit equal sensitivity to similarity values across the base range. Differences between values in the middle of the range, i.e., around 45o are amplified, and differences at the ends of the range, i.e., at 0o or 90o are diminished. Consequently, prior models, such as those employing a BART operator or other operators, might not optimally model all non-linear systems. In certain value ranges for certain sensors, these prior models may be inaccurate. Apart from selecting new or additional training data, both of which require additional time, as well as computer capacity, without providing any guarantee of improving the model, no effective way has been found in the prior art to adjust the empirical model to improve modeling fidelity.

Thus, there is a need for system monitoring mathematical operators for accurately measuring similarities between a monitored system and expected system states, flexibly modeling and improving model sensitivity such that component failures can be accurately predicted and so that acceptably functioning components are not prematurely replaced.

SUMMARY OF THE INVENTION

It is an object of the present invention to provide for equipment and process monitoring using empirical modeling with a class of improved operators for determining measures of similarities between modeled or known states of a system and a current or selected state of the system.

The present invention provides for monitoring equipment, processes or other closed systems instrumented with sensors and periodically, aperiodically or randomly recording a system snapshot therefrom. Thus, a monitored system, e.g., equipment, a process or any closed system, is empirically modeled using improved operators for determining system state similarity to known acceptable states. The improved operators provide for modeling with heightened or adjusted sensitivity to system state similarity for particular ranges of sensor values. The invention thus provides for greater possible fidelity of the model to the underlying monitored system.

The similarity between a system data snapshot and a selected known state vector is measured based on similarity values between corresponding parameter values from the data snapshot and the selected known state vector. Each similarity value is effectively computed according to a ratio of angles formed by the difference of the corresponding data values and by the range of corresponding values across all the known state vectors. Importantly, the ratio of angles is affected by the location within this range of the data value from the snapshot and the data value from the selected known state vector. The similarity engine can be flexibly honed to focus as through a lens on certain parts of the range with altered sensitivity, expanding or contracting those parts.

The similarity operator class of this invention can be used in a multivariate state estimation technique (MSET) type process monitoring technique as taught in U.S. Pat. No. 5,764,509, and can also be used for a variety of complex signal decomposition applications. In these applications, a complex signal can be decomposed into components (e.g., a frequency domain or wavelets), which are input to this MSET similarity engine. The similarity operator can be embodied both as general purpose computer software for a mainframe computer or a microprocessor or as code for an embedded processor. The result of the similarity operation can be used for generating estimated or expected states, or for identifying which one of a finite set of patterns stored in memory that most closely matches the input pattern.

By allowing selection of a curve instead of the base of a triangle in combination with angle selection, the present invention adds the advantage of providing a lens function for "lensing" certain parts of the range for greater or lesser sensitivity to differences that, ultimately, are reflected in the similarity for the two values. Where ease of computation is not an issue, the present invention provides improved lensing flexibility that allows freeform location of the apex point at different locations above the base.

The advantage afforded by lensing is that focus can be directed to different regions of interest in a particular range for a given sensor, when performing a similarity determination between a current state vector and a prior known expected state vector. Using this similarity determination an estimated state vector can be computed for a real-time system that is being monitored and modeled using MSET or the like. The model performance can be honed for improved model estimates using the improved class of similarity operators of the present invention.

The similarity operation of the present invention is rendered particularly non-linear and adaptive. The present invention can be used in system state classification, system state alarm notification, system virtual parameter generation, system component end of life determination and other techniques where an empirical model is useful. The present invention overcomes the above restrictions of the prior art methods by providing more flexibility to adapt and improve modeling fidelity.

The present invention also includes a similarity engine in an information processor embodiment. Preprocessed known state vectors characteristic of a desired operating condition, i.e., historic data, of a monitored system are stored in memory. A data acquisition unit acquires system parameter data, such as real-time sensor data, representative of the current state of the monitored system. The information processor is coupled to the memory and to the data acquisition system, and operates to process one system state frame or snapshot at a time from the data acquisition unit against the known state vector snapshots in the memory. A measure of similarity is computed between system state snapshots from the data acquisition unit and each known state vector in the memory. An expected state vector is computed from the snapshot for the monitored system.

The information processor may be further disposed to compare the state snapshots with the expected state vectors sequentially, to determine if they are the same or different. This determination can be used for an alarm or event trigger.

Briefly summarized, in a machine for monitoring an instrumented process or for analyzing one or more signals, an empirical modeling module for modeling non-linearly and linearly correlated signal inputs using a non-linear angular similarity function with variable sensitivity across the range of a signal input is described. Different angle-based similarity functions can be chosen for different inputs to improve sensitivity particular to the behavior of that input. Sections of interest within a range of a signal input can be lensed for particular sensitivity.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

FIG. 8A is a diagram showing an example of the lensing effect of the similarity operator of the present invention;

FIG. 8B is a diagram showing an example of an alternative approach to the use of the lensing effect of the similarity operator of the present invention;

FIGS. 9A–9D through 12A–12D illustrate alternate embodiments showing extension of range and lensing functions in similarity operators in accordance with the invention;

DETAILED DESCRIPTION OF THE PREFERRED EMBODIMENTS

Figure 1:
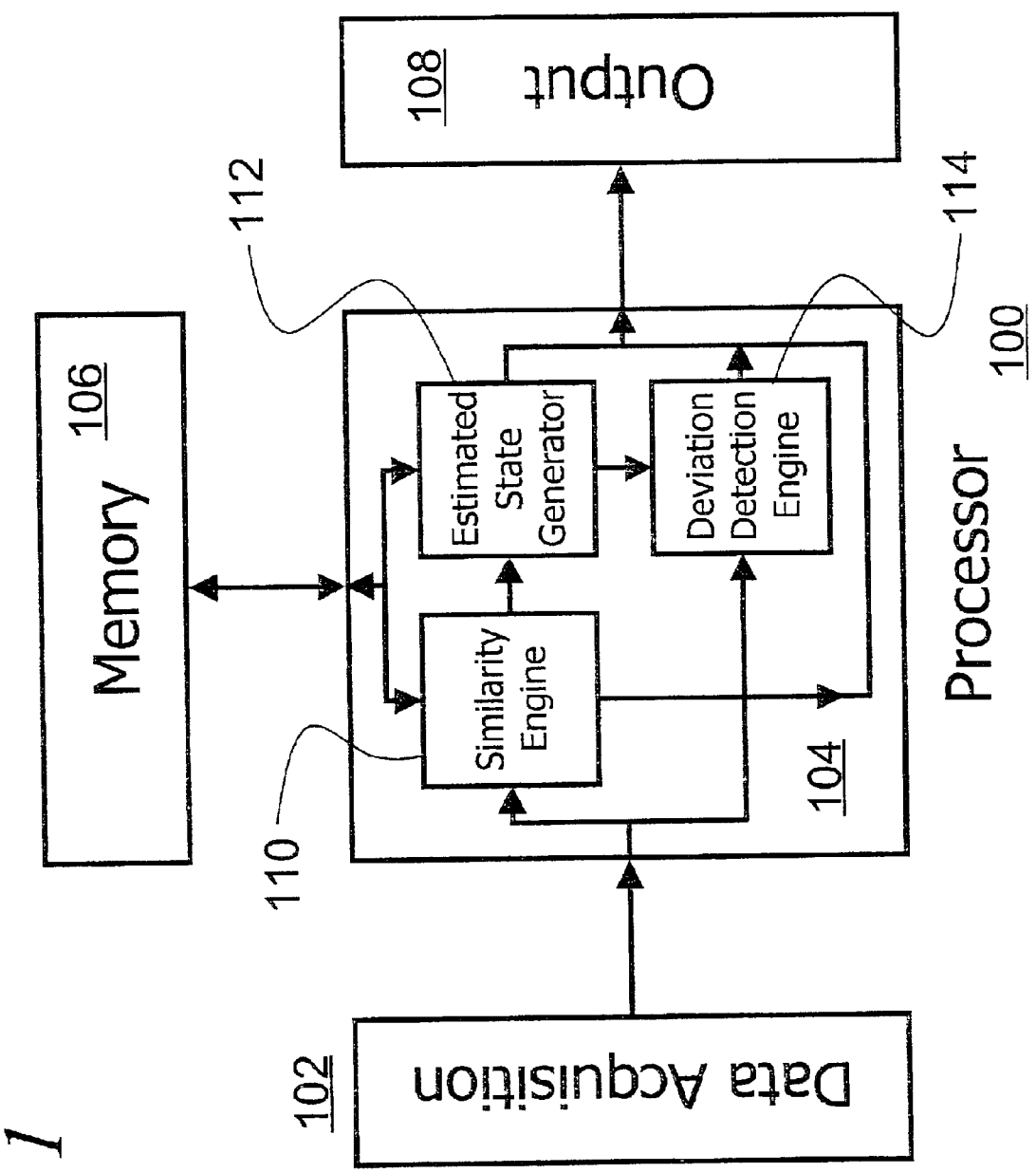
FIG. 1 is a functional block diagram of an example of an empirical modeling apparatus for monitoring an instrumented system.

As depicted in the example of FIG. 1, the inventive system 100 in a preferred embodiment comprises a data acquisition module 102, an information processor 104, a memory 106 and an output module 108, which can be coupled to other software, to a display, to an alarm system, or any other system that can utilize the results, as may be known in the art. The processor 104 generally may include a Similarity Engine 110, an Estimated State Generator 112 and a Deviation Detection Engine 114.

Memory 106 stores a plurality of selected time-correlated snapshots of sensor values characterizing normal, optimal, desirable or acceptable operation of a monitored process or machine. This plurality of snapshots, distilled according to a selected "training" method as described below, comprises an empirical model of the process or machine being monitored. In operation, the inventive monitoring system 100 samples current snapshots of sensor data via acquisition module 102. For a given set of time-correlated sensor data from the monitored process or machine running in real-time, the estimates for the sensors can be generated by the Estimated State Generator 112 according to:

$$\vec{y}_{estimated} = \vec{D} \cdot \vec{W} \quad (1)$$

where D is a matrix comprised of the plurality of snapshots in memory 106 and W is a contribution weighting vector determined by Similarity Engine 110 and Estimated State Generator 112 using a similarity operator such as the inventive class of similarity operators of the present invention. The multiplication operation is the standard matrix/vector multiplication operator. W has as many elements as there are snapshots in D, and is determined by:

$$\vec{W} = \frac{\hat{W}}{\left(\sum_{j=1}^{N} \hat{W}(j)\right)} \quad (2)$$

$$\hat{W} = \left(\overline{D}^T \otimes \overline{D}\right)^{-1} \cdot \left(\overline{D}^T \otimes \vec{y}_{in}\right) \quad (3)$$

where the T superscript denotes transpose of the matrix, and Y(in) is the current snapshot of actual, real-time sensor data. The improved similarity operator of the present invention is symbolized in the equation above as ⊗. Yin is the real-time or actual sensor values from the underlying system, and therefore it is a vector snapshot.

The similarity operation typically returns a scalar value between 0 and 1 for each comparison of one vector or matrix row to another vector. It represents a numeric quantification of the overall similarity of two system states represented by two snapshots of the same sensors. A similarity value closer to 1 indicates sameness, whereas a similarity value closer to 0 typically indicates difference.

Deviation detection engine 114 receives both the actual current snapshot of sensor values and the set of sensor value estimates from the estimated state generator 112, and compares the two. A variety of tests can be used, including the sequential probability ratio test (SPRT), or a CUSUM test, both of which are known in the art. Preferably, the set of actual sensor values and the set of estimated sensor values are differenced to provide residual values, one for each sensor. Applying the SPRT to a sequence of such residual values for a given sensor provides an advantageously early indication of any difference between the actual sensor values and what is expect under normal operation.

Figure 2:
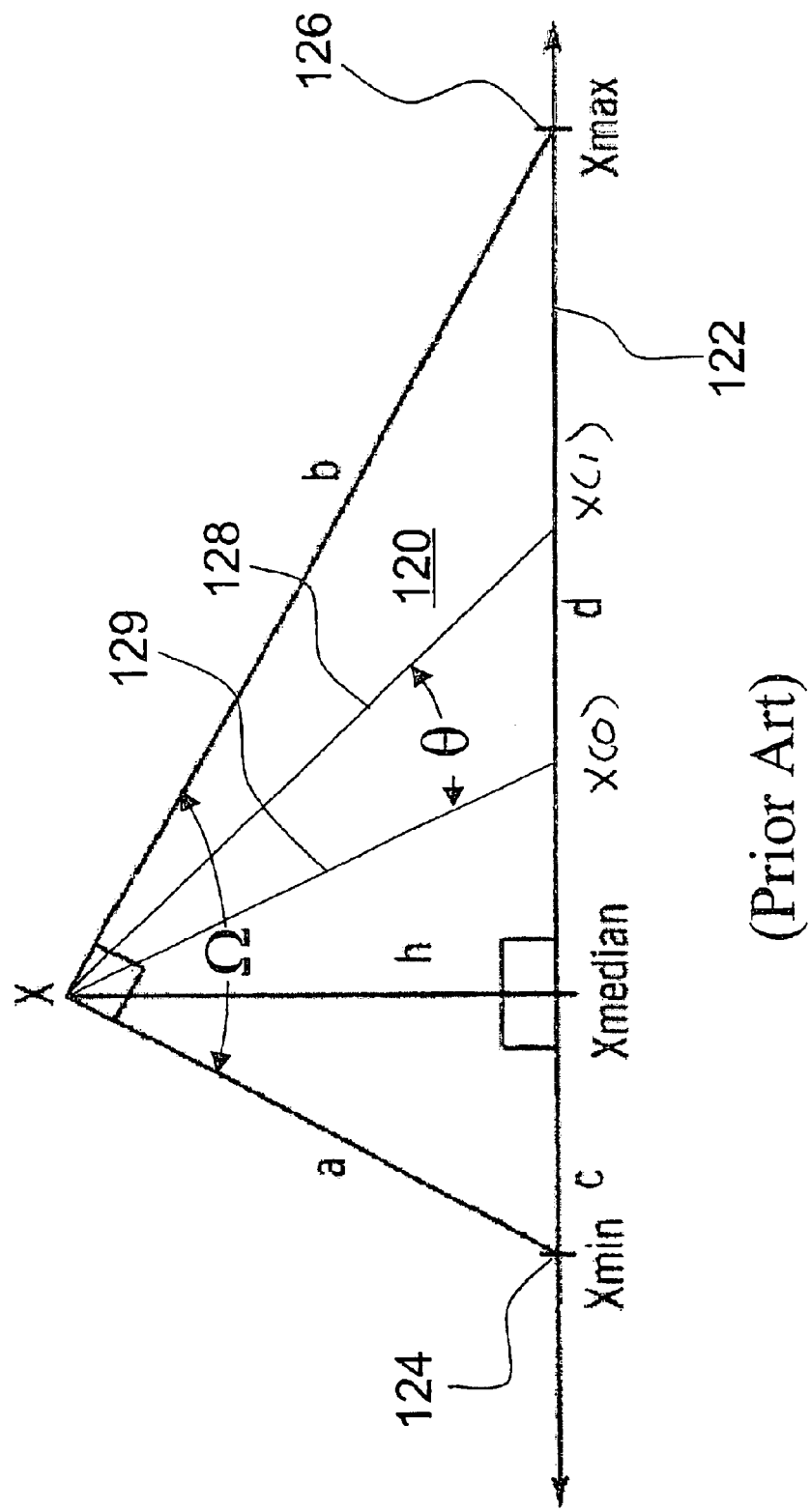
FIGS. 2 and 3 are diagrams showing an example of a prior art similarity operator.

FIG. 2 graphically illustrates the prior art BART similarity operation wherein a right triangle 120 is formed having a monotonically linear base 122 bounded by the range for a given sensor in training data, the range minimum and maximum forming vertices 124, 126 at opposite ends of the base 122. The triangle 120 was formed preferably as a right triangle with the right angle located at height (h) above the median of the range data along the base 122. In this prior art method the height (h) was required to be chosen so that the apex angle is a right angle. Then, in performing a similarity operation on two values of the sensor, each value was plotted along the base between minimum 124 and maximum 126 according to its value, and lines 128 and 129 were drawn from the apex to each plotted point $X_0$ and $X_1$, forming an angle therebetween. The similarity of the two values was then computed as a function of the comparison of the formed angle θ to the right angle Ω of the apex.

Figure 3:
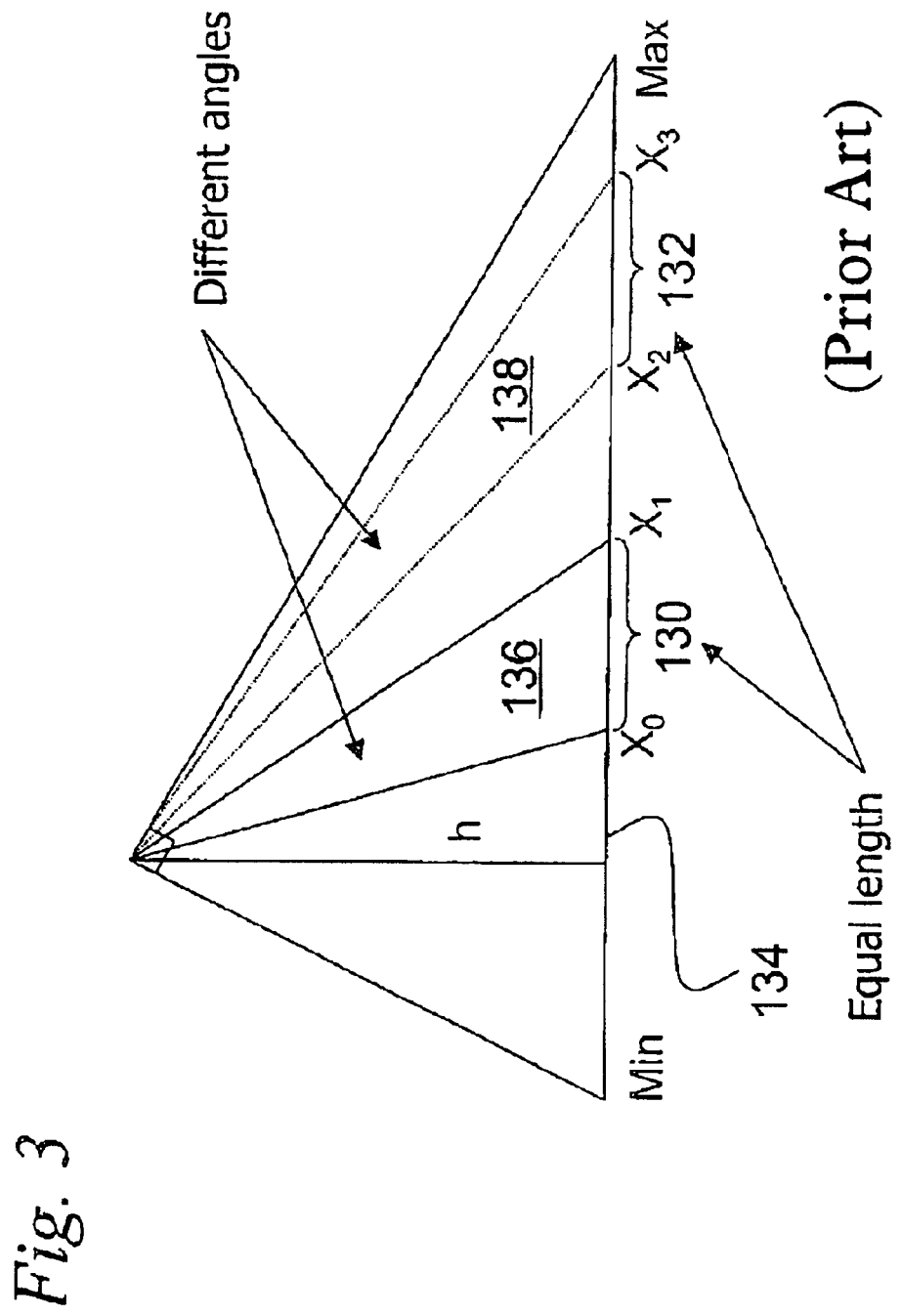

As can be seen from FIG. 3, which shows each of two different comparisons 130, 132, equally spaced pairs of values are compared in each instance for similarity by mapping the value pairs in the range for the sensor along the base 134. One of each of the pairs represents a sensor value from a training set vector and the other of the pair represents a sensor value from an input data vector. Each pair of values identifies a segment that, in combination with the apex, identifies a smaller triangle within the original right triangle. The angle in each of the smaller triangles 136, 138, that shares the apex and is a fraction of the right angle, provides a measure of similarity for the respective pair of values when scaled against the full ninety degrees (90°) of the right angle. This angle is zero degrees (0°) for an identical pair and 90° for a completely dissimilar pair at the extrema of the range stored in the training set.

The inventors have found that the restrictions of the prior art analysis method, i.e. a right triangle based model with its apex at the right angle and disposed immediately above the median value on the base (hypotenuse) for the particular parameter, may be ignored to provide a more useful, flexible and all encompassing analysis tool. Further, the inventors have determined that the analysis model need not be triangular at all but merely defined by two partial rays of an angle extending to endpoints identified by either a system parameter minimum or maximum and connected therebetween by a curve that may be linear or non-linear. The curve may be selected, for example, to highlight one region of operation while de-emphasizing another or others as set forth herebelow.

Figure 4:
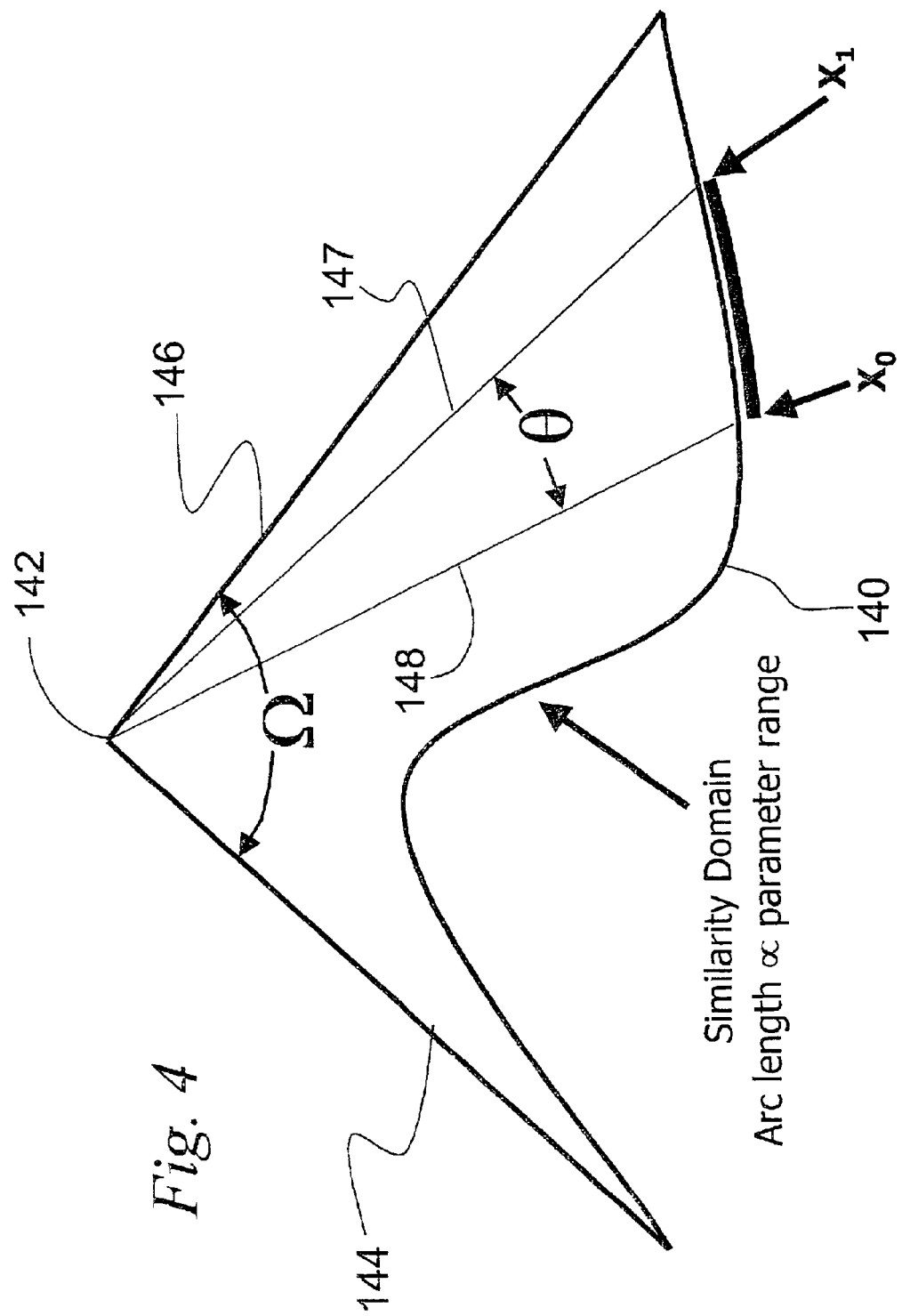
FIG. 4 is a diagram generally showing an example of a similarity operator according to the invention.

The most general form of the similarity operation of the invention is shown in FIG. 4. A range of data for a given parameter sensor across a training set is mapped to an arc length forming the curve 140 and being identified as a Similarity Domain. An apex location 142 may be chosen above the similarity domain curve 140, and an angle Ω is defined by connecting the apex with straight line segments 144 and 146 to the ends of the similarity domain 140.

Alternately, an angle may be selected and an apex location 142 derived accordingly.

According to one embodiment of the invention, the similarity domain (being the curve length) for a given sensor or parameter in a monitored system can be mapped by equating one end of the curve to the lowest value observed across the reference library or training set for that sensor, and equating the other end to the highest value observed across the training set for that sensor. The length between these extrema is scaled linearly (or in some other appropriate fashion, e.g., logarithmically where appropriate). According to another embodiment of the invention, expected lower and upper limits for a sensor can be chosen based on knowledge of the application domain, e.g., industrial, medical, etc., know-how. According to yet another embodiment, the similarity domain can be mapped using the extrema of the original data set from which the reference library or training set is distilled. This can be advantageous if the training method does not necessarily include the highest and lowest sensor readings.

The similarity of value pairs ("elemental similarity") is found by mapping that pair of values $X_0$ and $X_1$ onto the Similarity Domain for that sensor. Connecting these two points from the similarity domain curve with lines 147 and 148 to the apex 142 defines a second angle θ. The similarity of the pair of values is then defined as equal to:

$$S = 1 - \frac{\theta}{\Omega} \qquad (4)$$

Thus, the similarity value S is closer to one for value pairs that are more similar, and S is closer to zero for value pairs that are less similar. The elemental similarities are calculated for each corresponding pairs of sensor values (elements) of the two snapshots being compared. Then, the elemental similarities are combined in some statistical fashion to generate a single similarity scalar value for the vector-to-vector comparison. Preferably, this overall similarity, $S_{snapshot}$, of two snapshots is equal to the average of the number N (the element count) of elemental similarity values $S_c$:

$$S_{snapshot} = \frac{\sum_{c=1}^{N} S_c}{N} \qquad (5)$$

It can be understood that the general result of the similarity operation of the present invention applied to two matrices (or a matrix D and a vector $Y_{1n}$, as per equation 3 above) is a matrix (or vector) wherein the element of the $i^{th}$ row and $j^{th}$ column is determined from the $i^{th}$ row of the first operand and the $j^{th}$ column of the second operand. The resulting element (i,j) is a measure of the sameness of these two vectors. In the present invention, the $i^{th}$ row of the first operand generally has elements corresponding to sensor values for a given temporally related state of the process or machine, and the same is true for the $j^{th}$ column of the second operand. Effectively, the resulting array of similarity measurements represents the similarity of each state vector in one operand to each state vector in the other operand.

By way of example, two vectors (the ith row and jth column) are compared for similarity according to equation 4 above on an element-by-element basis. Only corresponding elements are compared, e.g., element (i,m) with element (m,j) but not element (i,m) with element (n,j). For each such comparison, the similarity is given by equation 4, with reference to a similarity operator construct as in FIG. 4. Hence, if the values are identical, the similarity is equal to one, and if the values are grossly unequal, the similarity approaches zero. When all the elemental similarities are computed, the overall similarity of the two vectors is equal to the average of the elemental similarities. A different statistical combination of the elemental similarities can also be used in place of averaging, e.g., median.

Figure 5:
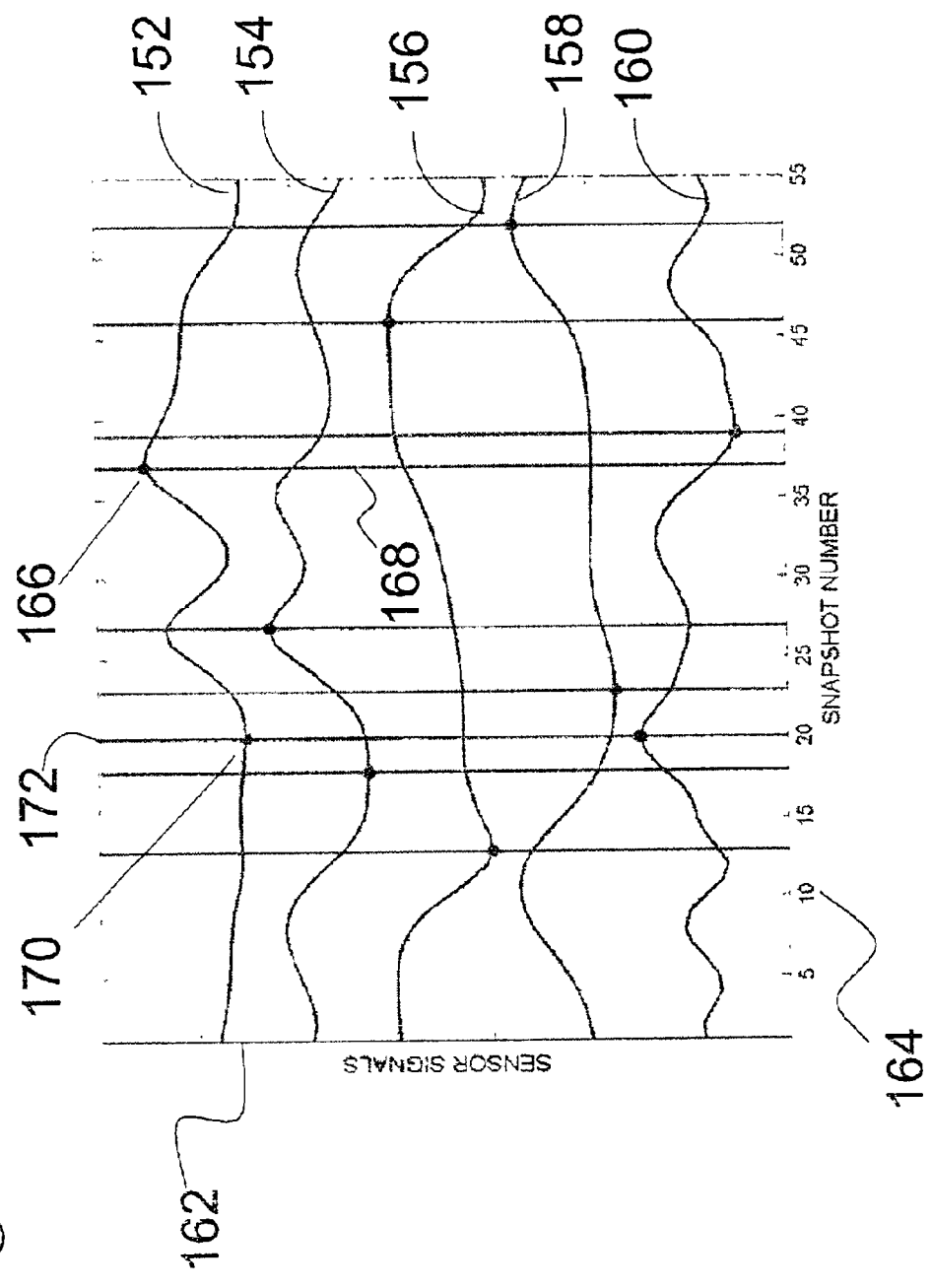
FIG. 5 illustrates distillation of sensor data to create a training data set representative of the similarity domain.

The matrix D of reference snapshots stored in memory 106 characterizing acceptable operation of the monitored process or machine is composed using a method of training, that is, a method of distilling a larger set of data gathered from the sensors on the process or machine while it is running in known acceptable states. FIG. 5 graphically depicts such a method for distilling the collected sensor data to create a representative training data set (D matrix) for defining a Similarity Domain. In this simple example only five sensor signals 152, 154, 156, 158 and 160 are shown for the process or machine to be monitored. Although described herein generically as comparing system vectors, "system" is used for example only and not intended as a limitation. System is intended to include any system living or dead whether a machine, a process being carried out in a system or any other monitorable closed system.

Continuing this example, the sample number or a time stamp of the collected sensor data is on the abscissa axis 162, where the data is digitally sampled and the sensor data is temporally correlated at each sample. The ordinate axis 164 represents the relative magnitude of each sensor reading over the samples or "snapshots." In this example, each snapshot represents a vector of five elements, one reading for each sensor in that snapshot. Of all the sensor data collected (in all of the snapshots), according to this training method example, only those five-element snapshots are included in the representative training set that contain either a global minimum or a global maximum value for any given sensor. Therefore, the global maximum 166 for sensor signal 152 justifies inclusion of the five sensor values at the intersections of line 168 with each sensor signal 152, 154, 156, 158, 160, including global maximum 166, in the representative training set, as a vector of five elements. Similarly, the global minimum 170 for sensor signal 152 justifies inclusion of the five sensor values at the intersections of line 172 with each sensor signal 152, 154, 156, 158, 160. So, collections of such snapshots represent states the system has taken on and, that are expected to reoccur. The pre-collected sensor data is filtered to produce a "training" subset that reflects all states that the system takes on while operating "normally" or "acceptably" or "preferably." This training set forms a matrix, having as many rows as there are sensors of interest, and as many columns (snapshots) as necessary to capture all the acceptable states without redundancy.

Figure 6:
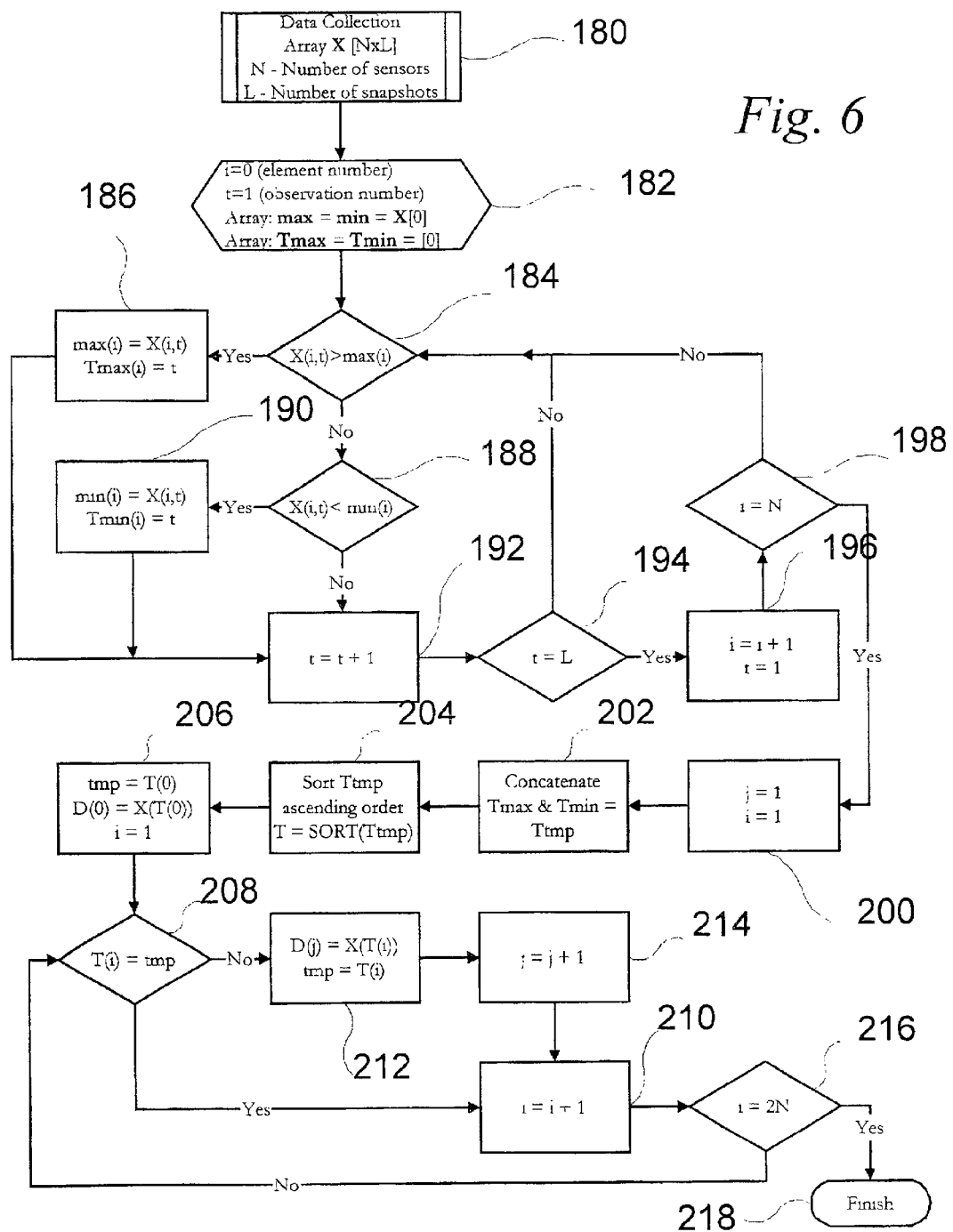
FIG. 6 shows the steps of a method of distilling sensor data to a training set for use with the present invention.

Turning to FIG. 6, the training method of FIG. 5 is shown in a flowchart. Data so collected in step 180 from N sensors at L observations or snapshots or from temporally related sets of sensor parameter data, form an array X of N rows and L columns. In step 182, an element number counter (i) is initialized to zero, and an observation or snapshot counter (t) is initialized to one. Two arrays, "max" and "min," for containing maximum and minimum values respectively across the collected data for each sensor, are initialized to be vectors each of N elements which are set equal to the first column of X. Two additional arrays, Tmax and Tmin, for holding the observation number of the maximum and minimum value seen in the collected data for each sensor, are initialized to be vectors each of N elements, all zero.

In step 184, if the value of sensor number i at snapshot number t in X is greater than the maximum yet seen for that sensor in the collected data, max(i) is updated to equal the sensor value and Tmax(i) stores the number t of the observation in step 186. If not, a similar test is done for the minimum for that sensor in steps 188 and 190. The observation counter is incremented in step 192. In step 194, if all the observations have been reviewed for a given sensor (i.e., t=L), then t is reset to zero and i is incremented (in preparation for finding the maximum and minimum for the next sensor) in step 196. If the limits have been found for the last sensor (i.e., i=N), step 198, then redundancies are removed (i.e., eliminate multiple occurrences of snapshots that have been selected for two or more parameters) and an array D is created from the resulting subset of snapshot vectors from X.

So, in step 200, counters i an j are initialized to one. In step 202, arrays Tmax and Tmin are concatenated to form a single vector Ttmp having 2N elements. These array elements are sorted into ascending (or descending) order in step 204 to form array T. In step 206, holder tmp is set to the first value in T (an observation number that contains a sensor minimum or maximum). The first column of D is set equal to the column of X corresponding to the observation number that is the first element of T. In the loop starting with decision step 208, the ith element of T is compared to the value of tmp that contains the previous element of T. If the two adjacent values of T are equal indicating that the corresponding observation vector is a minimum or maximum for more than one sensor, then, it has already been included in D and need not be included again. Counter i is incremented in step 210. If the two adjacent values are not equal, D is updated to include the column from X that corresponds to the observation number of T(i) in step 212, and tmp is updated with the value at T(i). The counter (j) is then incremented in step 214. In step 216, if all the elements of T have been checked, then the distillation into training set D has finished in step 218 and D is stored in memory 106.

The training set as selected according to the above method may additionally be augmented using a number of techniques. For example, once the snapshots selected according to the above Min–Max method are determined, the remaining original set of data may be selected from and added to the training set at regular time stamp intervals. Yet another way of adding more snapshots to the Min–Max training set involves randomly selecting a remaining number of snapshots from the original set of data.

Once the D matrix has been determined, in a training and implementation phase, the preferred similarity engine 110 is turned on with the underlying system being monitored, and through time, actual snapshots of real sensor values are input to the Similarity Engine 110 from Data Acquisition Unit 102. The output of the results from Similarity Engine 110 can be similarity values, expected values, or the "residual" values (being the difference between the actual and expected values).

One of these output types is selected and passed to the deviation detection engine 114 of FIG. 1, which then determines through a series of such snapshots, whether a statistically significant change has occurred as set forth hereinbelow. In other words, the statistical significance engine effectively determines if those real values represent a significant change from the "acceptable" states stored in the D matrix. Thus, a vector (Y) is generated in Estimated State Generator 112 of expected sensor values from contributions by each of the snapshots in D, which contributions are determined by a weight vector W. W has as many elements as there are snapshots in D and W is determined according to equations 2 and 3 above.

The deviation detection engine 114 can implement a comparison of the residuals to selected thresholds to determine when an alert should be output of a deviation in the monitored process or machine from recognized states stored in the reference library. Alternatively, a statistical test, preferably the sequential probability ratio test (SPRT) can be used to determine when a deviation has occurred. The basic approach of the SPRT technique is to analyze successive observations of a sampled parameter. A sequence of sampled differences between the generated expected value and the actual value for a monitored sensor signal should be distributed according to some kind of distribution function around a mean of zero. Typically, this will be a Gaussian distribution, but it may be a different distribution, as for example a binomial distribution for a parameter that takes on only two discrete values (this can be common in telecommunications and networking machines and processes). Then, with each observation, a test statistic is calculated and compared to one or more decision limits or thresholds. The SPRT test statistic generally is the likelihood ratio $l_n$, which is the ratio of the probability that a hypothesis $H_1$ is true to the probability that a hypothesis $H_0$ is true:

$$l_n = \frac{(y_1, y_2, \ldots, y_n | H_1)}{(y_1, y_2, \ldots, y_n | H_0)} \qquad (6)$$

where $Y_n$ are the individual observations and $H_n$ are the probability distributions for those hypotheses. This general SPRT test ratio can be compared to a decision threshold to reach a decision with any observation. For example, if the outcome is greater than 0.80, then decide $H_1$ is the case, if less than 0.20 then decide $H_0$ is the case, and if in between then make no decision.

The SPRT test can be applied to various statistical measures of the respective distributions. Thus, for a Gaussian distribution, a first SPRT test can be applied to the mean and a second SPRT test can be applied to the variance. For example, there can be a positive mean test and a negative mean test for data such as residuals that should distribute around zero. The positive mean test involves the ratio of the likelihood that a sequence of values belongs to a distribution $H_0$ around zero, versus belonging to a distribution $H_1$ around a positive value, typically the one standard deviation above zero. The negative mean test is similar, except $H_1$ is around zero minus one standard deviation. Furthermore, the variance SPRT test can be to test whether the sequence of values belongs to a first distribution $H_0$ having a known variance, or a second distribution $H_2$ having a variance equal to a multiple of the known variance.

For residuals derived for sensor signals from the monitored process or machine behaving as expected, the mean is zero, and the variance can be determined. Then in run-time monitoring mode, for the mean SPRT test, the likelihood that $H_0$ is true (mean is zero and variance is $\sigma^2$) is given by:

$$L(y_1, y_2, \ldots, y_n | H_0) = \frac{1}{(2\pi\sigma)^{n/2}} e^{\left[-\frac{1}{2\sigma^2}\sum_{k=1}^{n} y_k^2\right]} \qquad (7)$$

and similarly, for $H_1$, where the mean is M (typically one standard deviation below or above zero, using the variance determined for the residuals from normal operation) and the variance is again $\sigma^2$ (variance is assumed the same):

$$L(y_1, y_2, \ldots, y_n \mid H_1) = \frac{1}{(2\pi\sigma)^{n/2}} e^{\left[-\frac{1}{2\sigma^2}\left(\sum_{k=1}^{n} y_k^2 - 2\sum_{k=1}^{n} y_k M + \sum_{k=1}^{n} M^2\right)\right]} \quad (8)$$

The ratio $1_n$ from equations 7 and 8 then becomes:

$$l_n = e^{\left[-\frac{1}{2\sigma^2}\sum_{k=1}^{n} M(M - 2y_k)\right]} \quad (9)$$

A SPRT statistic can be defined for the mean test to be the exponent in equation 9:

$$SPRT_{mean} = -\frac{1}{2\sigma^2}\sum_{k=1}^{n} M(M - 2y_k) \quad (10)$$

The SPRT test is advantageous because a user-selectable false alarm probability $\alpha$ and a missed alarm probability $\beta$ can provide thresholds against with $SPRT_{mean}$ can be tested to produce a decision:

1. If $SPRT_{mean} \leq \ln(\beta/(1-\alpha))$, then accept hypothesis $H_0$ as true;
2. If $SPRT_{mean} \geq \ln((1-\beta)/\alpha)$, then accept hypothesis $H_1$ as true; and
3. If $\ln(\beta/(1-\alpha)) < SPRT_{mean} < \ln((1-\beta)/\alpha)$, then make no decision and continue sampling.

For the variance SPRT test, the problem is to decide between two hypotheses: $H_2$ where the residual forms a Gaussian probability density function with a mean of zero and a variance of $V\sigma^2$; and $H_0$ where the residual forms a Gaussian probability density function with a mean of zero and a variance of $\sigma^2$. The likelihood that $H_2$ is true is given by:

$$L(y_1, y_2, \ldots, y_n \mid H_2) = \frac{1}{(2\pi V^{1/2}\sigma)^{n/2}} e^{\left[-\frac{1}{2V\sigma^2}\sum_{k=1}^{n} y_k^2\right]} \quad (11)$$

The ratio $1_n$ is then provided for the variance SPRT test as the ratio of equation 11 over equation 7, to provide:

$$l_n = V^{-1/2} e^{\left[-\frac{1}{2\sigma^2}\sum_{k=1}^{n} y_k^2\left(\frac{1-V}{V}\right)\right]} \quad (12)$$

and the SPRT statistic for the variance test is then:

$$SPRT_{variance} = \frac{1}{2\sigma^2}\left(\frac{V-1}{V}\right)\sum_{k=1}^{n} y_k^2 - \frac{\ln V}{2} \quad (13)$$

Thereafter, the above tests (1) through (3) can be applied as above:

1. If $SPRT_{variance} \leq \ln(\beta/(1-\alpha))$, then accept hypothesis $H_0$ as true;
2. If $SPRT_{variance} \geq \ln((1-\beta)/\alpha)$, then accept hypothesis $H_2$ as true; and
3. If $\ln(\beta/(1-\alpha)) < SPRT_{variance} < \ln((1-\beta)/\alpha)$, then make no decision and continue sampling.

Each snapshot of residuals (one residual "signal" per sensor) that is passed to the SPRT test module, can have SPRT test decisions for positive mean, negative mean, and variance for each parameter in the snapshot. In an empirical model-based monitoring system according to the present invention, any such SPRT test on any such parameter that results in a hypothesis other than $H_0$ being accepted as true is effectively an alert on that parameter. Of course, it lies within the scope of the invention for logic to be inserted between the SPRT tests and the output alerts, such that a combination of a non-$H_0$ result is required for both the mean and variance SPRT tests in order for the alert to be generated for the parameter, or some other such rule.

The output of the deviation detection engine 114 will represent a decision for each sensor signal input, as to whether the estimate is different or the same. These decisions, in turn, can be used to diagnose the state of the process or equipment being monitored. The occurrence of some difference decisions in conjunction with other sameness decisions can be used as an indicator of likely future machine health or process states. The SPRT decisions can be used to index into a diagnostic lookup database, automatically diagnosing the condition of the process or equipment being monitored.

Generally, any statistical hypothesis test as known by those skilled in the statistical arts can be substituted for the above-described application of SPRT. In addition, decisioning methods known in the art such as fuzzy logic sets and neural networks can be used to render a decision with regard to the sameness or difference of the estimates and the actual values.

In contrast to the restrictions imposed on the above-described BART technique, the location of the apex and the shape and length of the curve forming the similarity domain of the preferred embodiment can be selected to adjust sensitivity to similarity of two values differently for different parts of the Similarity Domain. In so doing, regions of interest for particular sensors can be lensed to enhance sensitivity to similarity, flexibility not available in prior techniques. Mathematical methods for computing the angles $\Omega$ and $\theta$ are known in the art, and can include numerical techniques for approximating the angles.

Figure 7A:
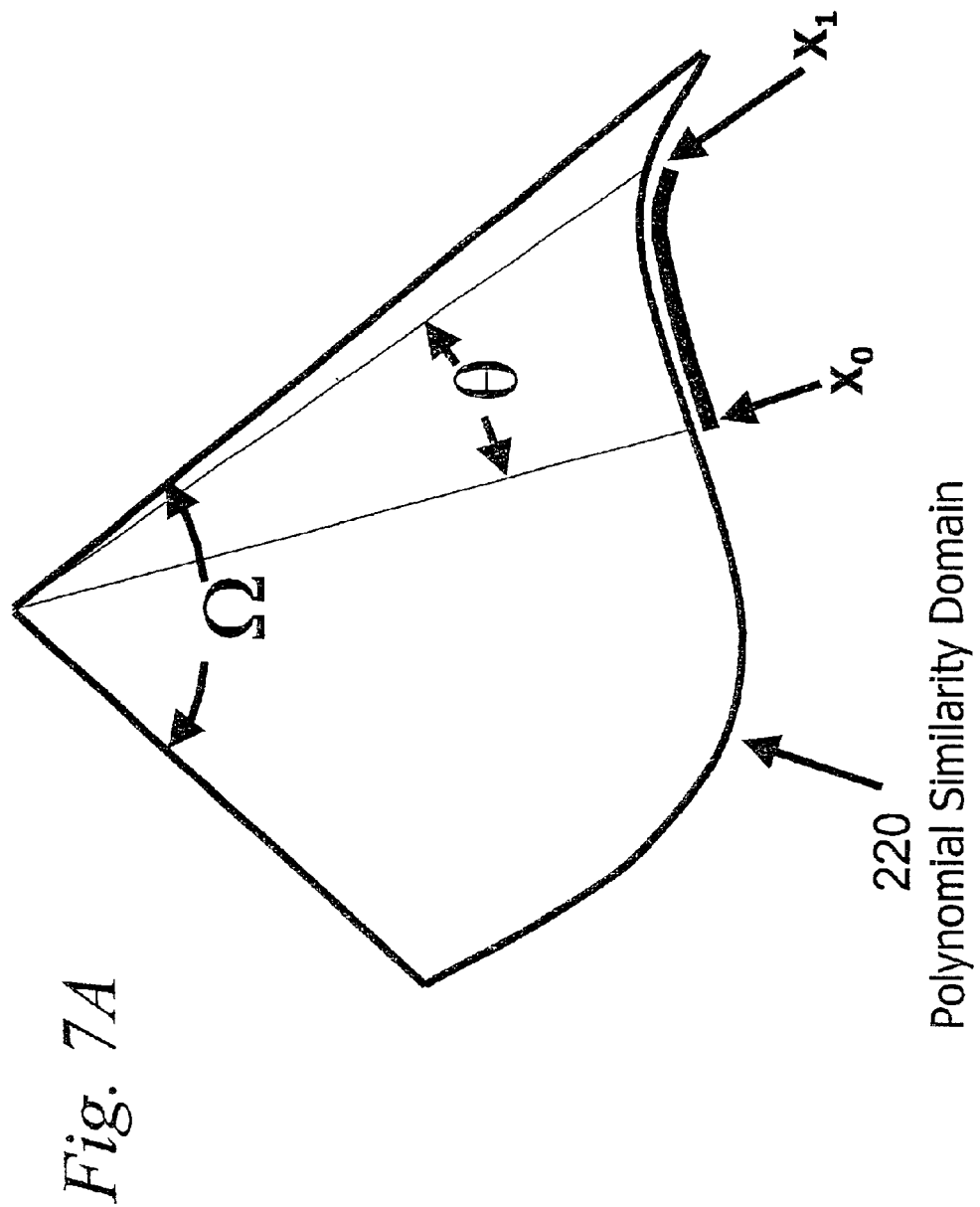
FIG. 7A is a diagram showing an example of a polynomial embodiment of a similarity operator according to the invention.
Figure 7B:
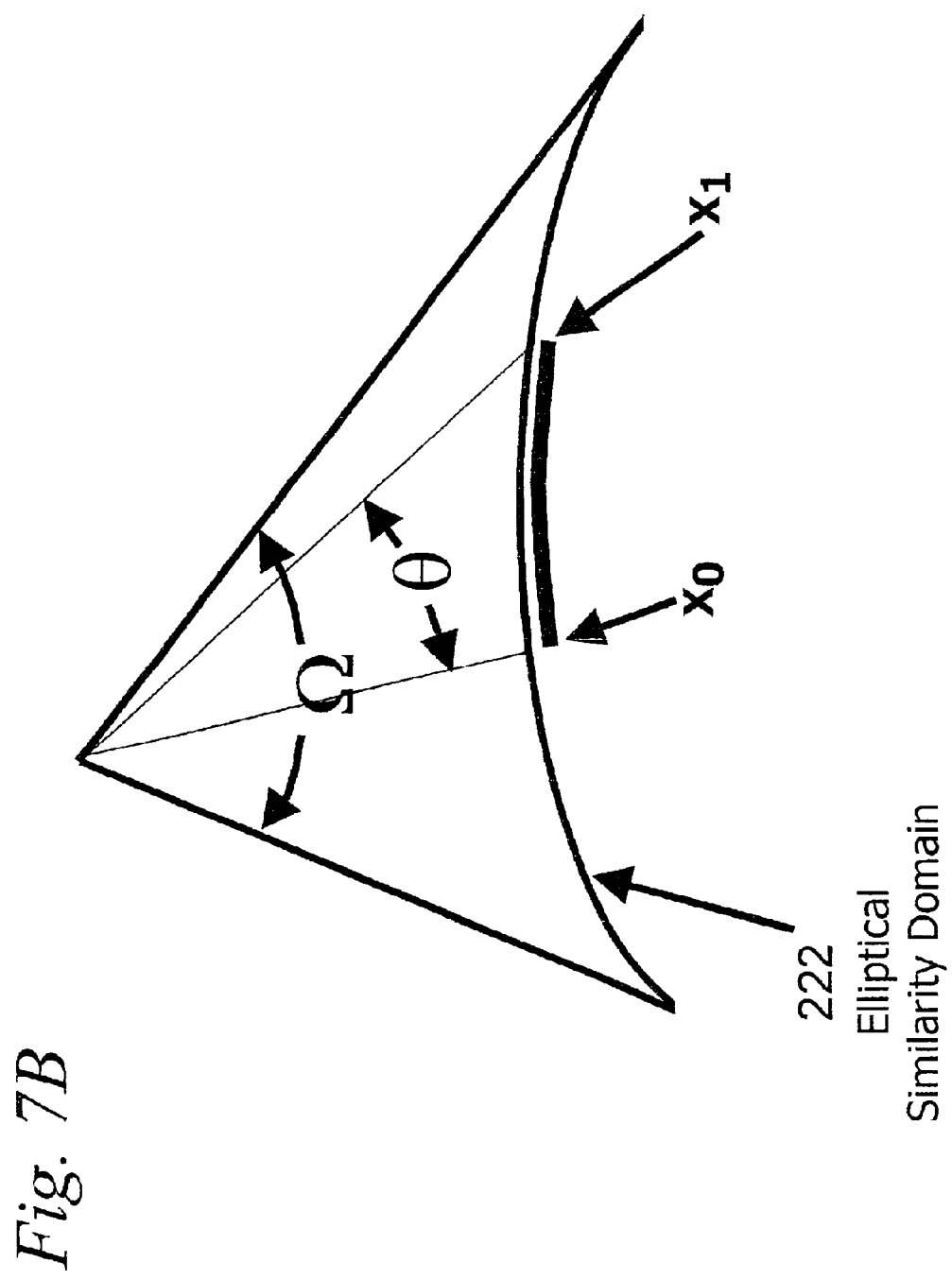
FIG. 7B is a diagram showing an example of an elliptical embodiment of a similarity operator according to the invention.
Figure 7C:
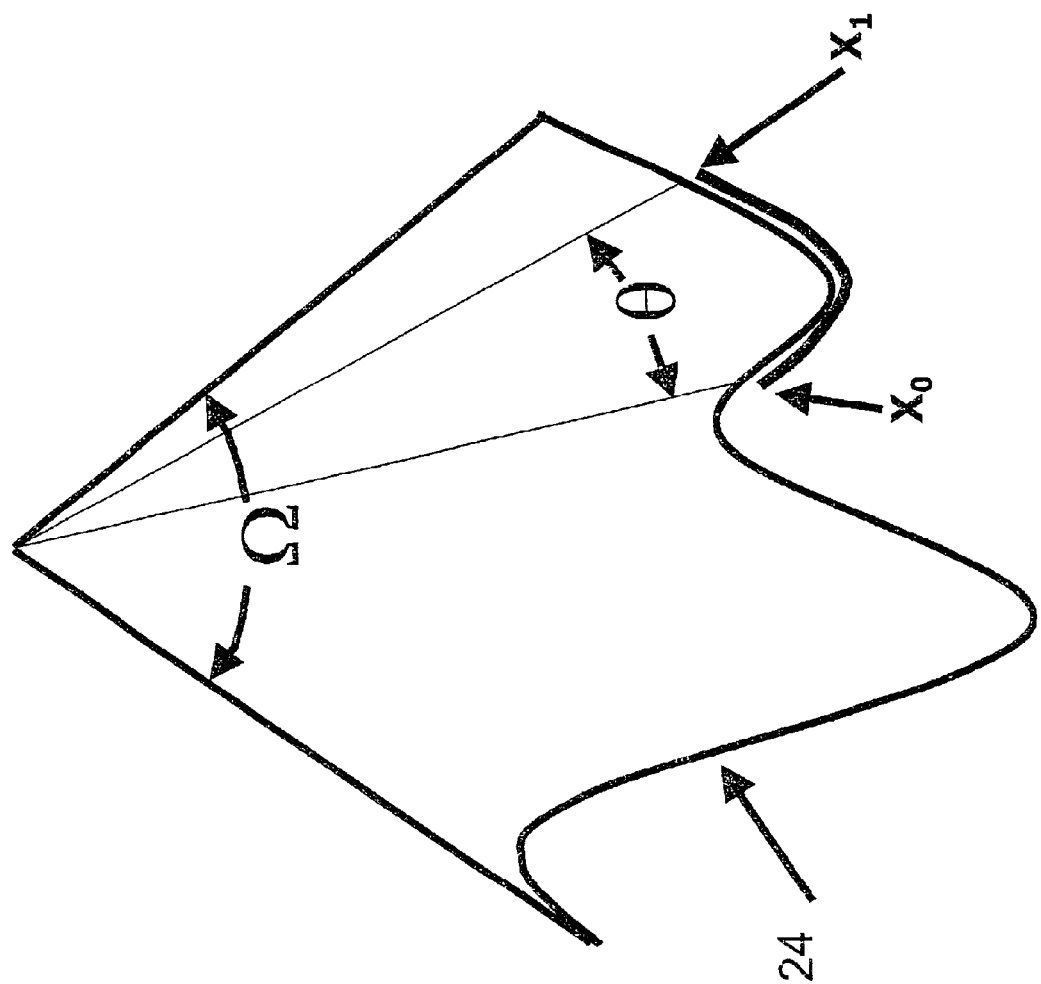
FIG. 7C is a diagram showing an example of a trigonometric embodiment of a similarity operator according to the invention.

FIGS. 7A–C show examples of particular forms of the similarity operator of the invention in which lensing is applied to the Similarity Domain. The example of FIG. 7A shows a Similarity Domain defined by a polynomial curve 220, in this example a function based on a polynomial including terms a fourth power, a third power, and a square. FIG. 7B shows yet another example of a particular form of the similarity operator of the invention in which the Similarity Domain is defined by an elliptical arc 222. In this example the elliptical arc 222 forms a convex similarity domain from the perspective of the apex and line segments forming angle $\Omega$. It is also within the scope of the invention to use the concave elliptical arc. An example of a trigonometric Similarity Domain shown in FIG. 7C wherein the Similarity Domain curve 224 is defined by a function of the sum of a sine and a cosine and wherein the amplitude of the sine is twice that of the cosine.

FIG. 8A shows an example wherein the lensing effect of the similarity operator according to the present invention is enhanced for visible understanding. Although the Similarity Domain distance between value pairs at arcs 230, 232 are of equal arc length, they are mapped to different areas of the similarity domain 234. Thus, these arcs 230, 232 represent two separate pairs of values being compared for similarity with quite different results. Even though the scalar difference between the values in the two pairs is equal, one pair at arc 230 falls toward a part of the range in the training set (a part of the similarity domain 234) that yields a very narrow angle 236, whereas the other pair at arc 232 falls in a part of the similarity domain 234 that yields a much wider angle 238. The pair at arc 232 with the wider angle 238 will thus have a similarity value lower than the pair at arc 230 with the narrower angle 236, even though both pairs are separated by arcs 230, 232 having the same scalar distance.

Turning to FIG. 8B, an alternative approach to the similarity operator of the present invention is shown. Similarity domain 234 is now mapped to from the straight baseline 802, which provides the linear scale from an expected overall minimum 804 to an expected overall maximum 806 for the sensor, on which to map the sensor value differences 230 and 232 (which are equal differences, but at different parts of the expected range). Mapping sensor value differences 230 and 232 to the similarity domain 234 provides angles 810 and 812. The angles 810 and 812 can be seen to be different, even though the length of the sensor value difference (either 230 or 232) is equal, hence providing the advantageous lensing effect. An angle 810 or 812 is compared to the overall angle Ω to provide a measure of similarity as per the equations above for two sensor values that have a difference of 230 or 232 respectively.

Figure 9C:
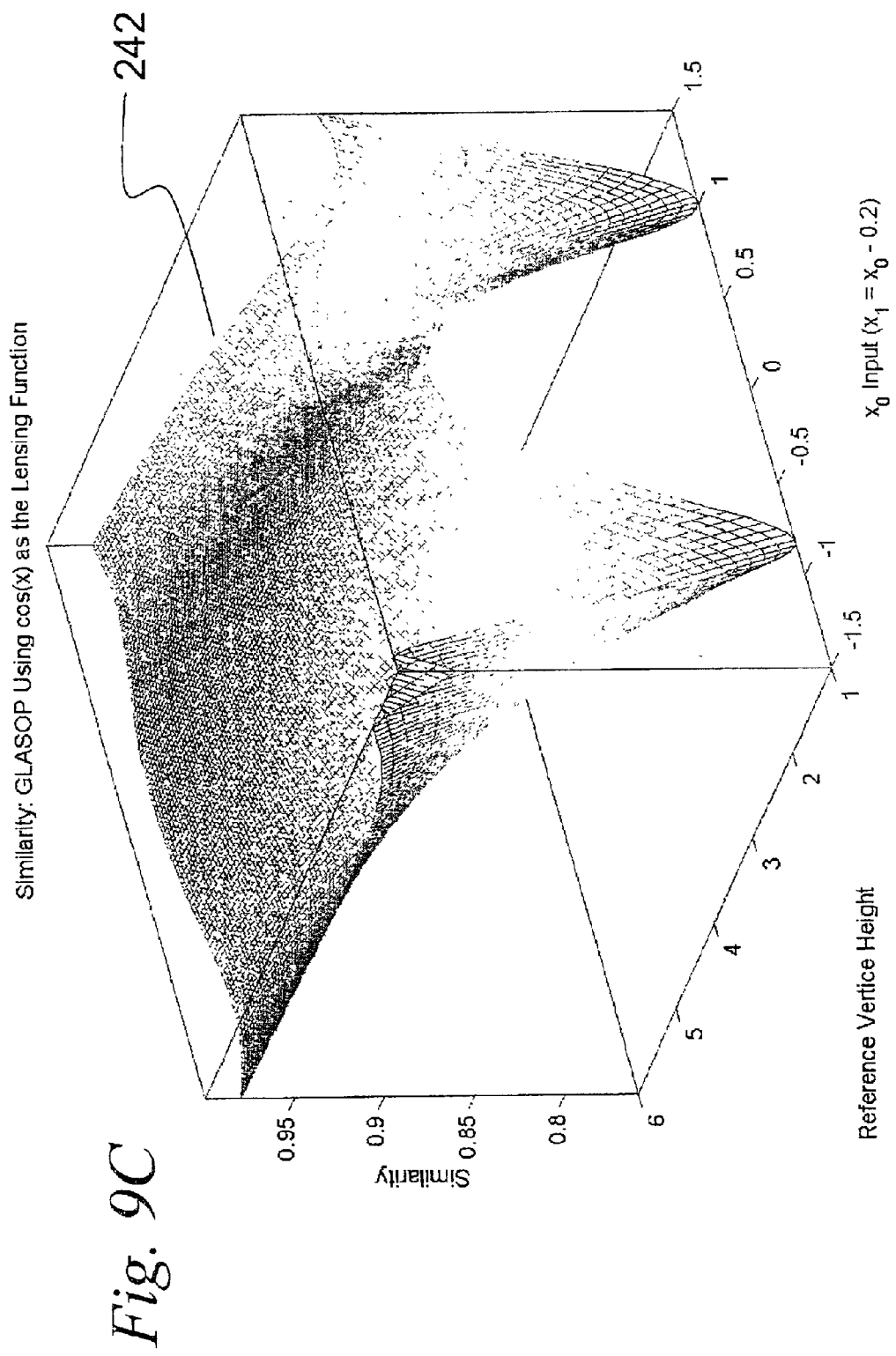
Figure 9D:
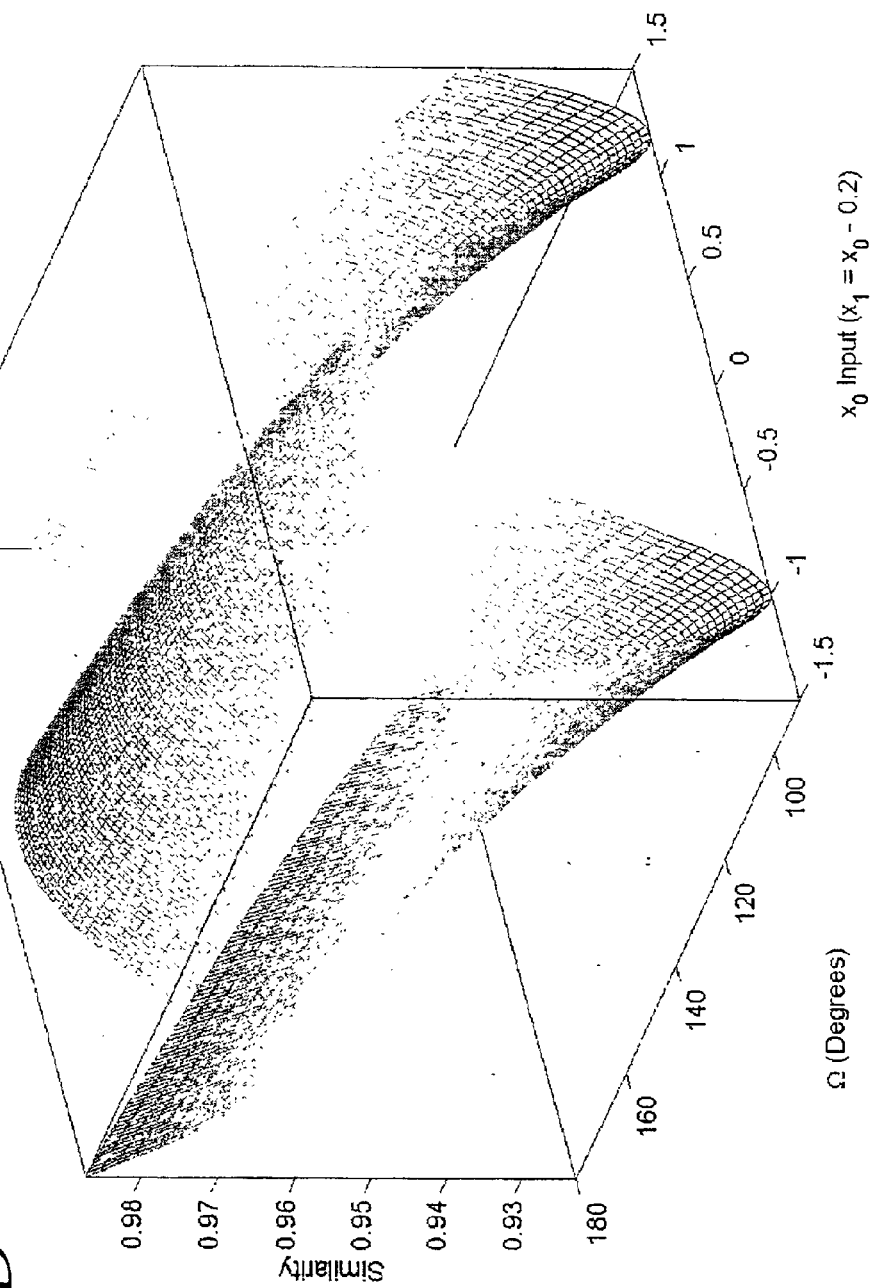

This alternative approach is further understood with reference to FIGS. 9A–9D through 12A–12D, which show examples of four additional alternate embodiments with lensing functions being defined according to sinusoidal and polynomial functions for use with the similarity operators. In particular, FIG. 9A shows a cosine function 240 as the lensing function extending the range for Ω beyond 90° and showing equal length sensor value differences 903, 905, 907, and 909 positioned over the cosine lensing function range. Each length 903, 905, 907 and 909 represents a same sensor value difference, but located in a different part of the expected range for the sensors being compared. Each forms a different angle θ with respect to lines drawn to the vertex 244, such as lines 913 and 915. This angle is then compared to the angle Ω shown therein to provide a measure of similarity, is generally defined by the edges of the mapped range, from a minimum expected range value to a maximum expected range value, and in this case was 90°. It can also be seen that the inventive similarity operation can accommodate data points outside the edges of the expected minimums and maximums. FIG. 9B shows the corresponding similarity values generated by smoothly moving the equal length sensor value difference (same as 903, etc., with a length of 0.2) across the entire range. FIG. 9C provides a three-dimensional surface 242 illustrating a range of similarity values for the cosine lensing function 240 for a vertex 244 located at varying heights above the similarity domain, to demonstrate the effect on the similarity curve of FIG. 9B of the vertex height. Generally, an increase in the height of the vertex 244 above the similarity domain 240 flattens out the lensing effect of the curve and drives similarity values higher. FIG. 9B illustrates a slice in surface 242 at a vertex height of 3. FIG. 9D illustrates how changing the expected range angle Ω (in this example from 90° through 180°) results in changing similarity values.

Figure 10C:
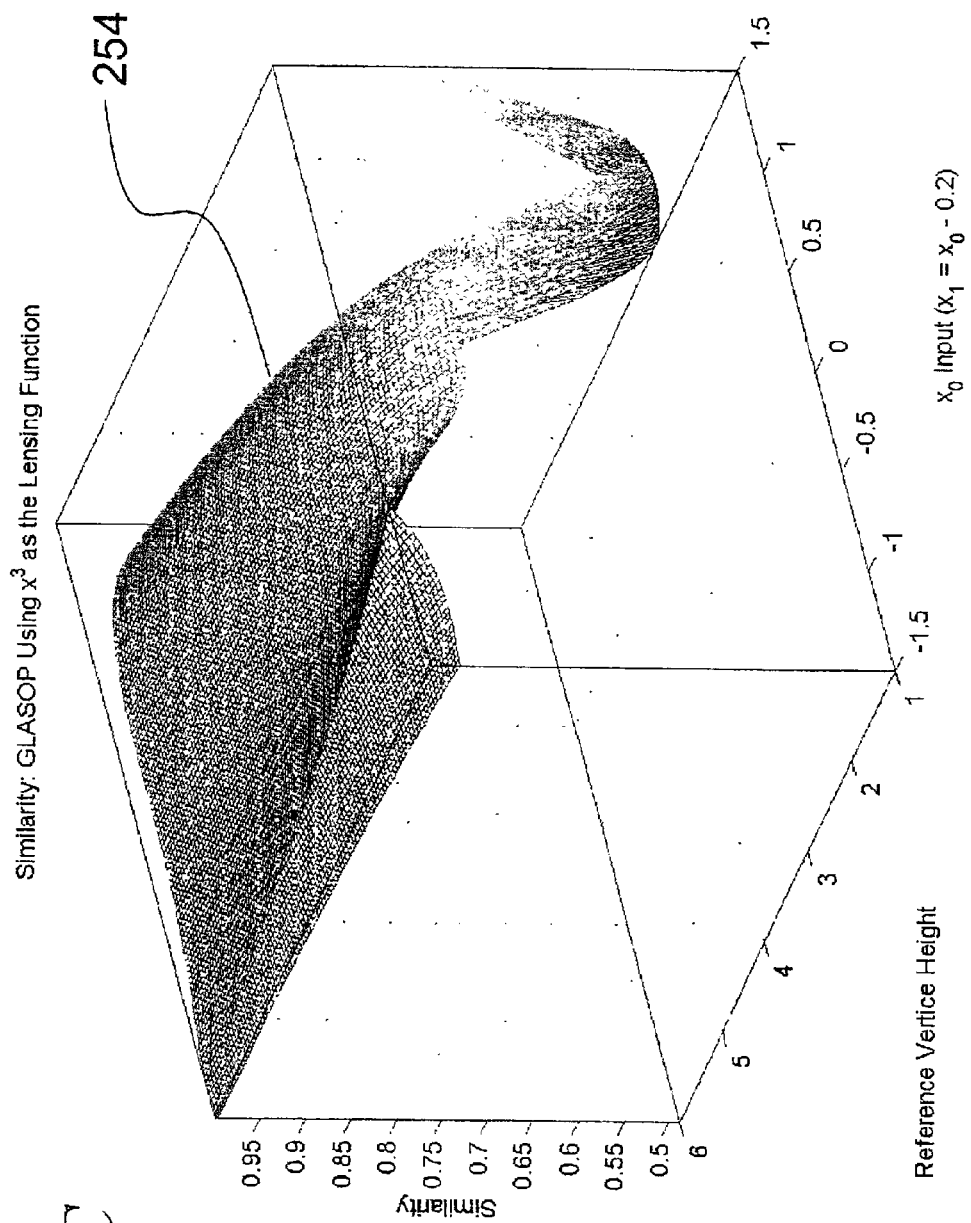
Figure 10D:
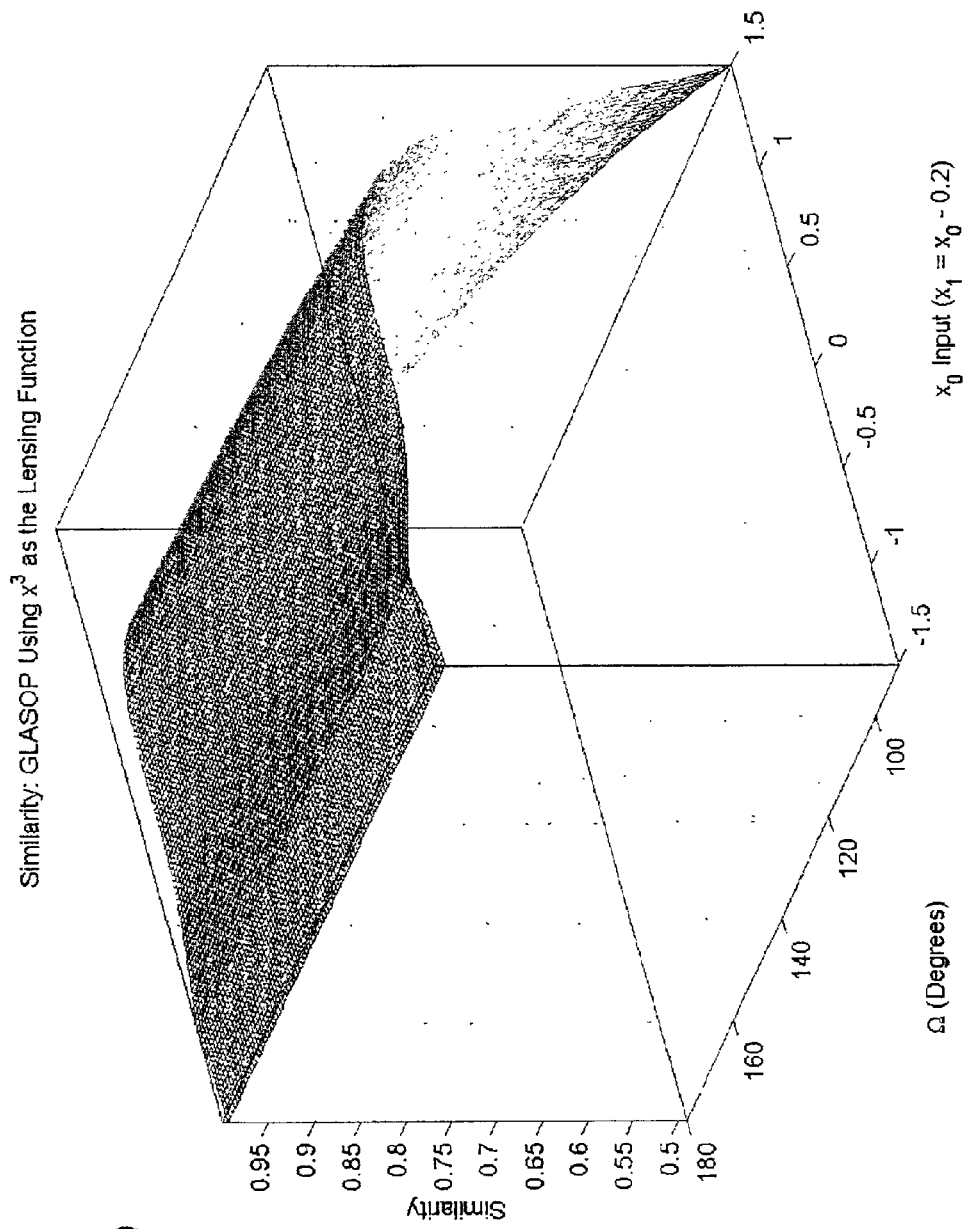

FIG. 10A is an example wherein $x^3$ is applied as a lensing function to form curve 250 with vertex 252 selected thereabove. FIG. 10B shows the effect of the lensing functions curve 250 on similarity values, which corresponds to vertex height-1.2 on surface 254 of FIG. 10C. Thus, the similarity values are plotted in FIG. 10B for the $x^3$ lensing function, illustrating a segment at approximately-1.2 as showing a similarity value of 1. This is further illustrated in the three-dimensional surface plot of FIG. 10C which corresponds to the knee of the $x^3$ lensing function and generates a similarity value of 1 for points mapped from the apex to points on the polynomial curve that generate θ=0. The surface 254 of FIG. 10C illustrates the effect of vertex 252 height on similarity values. FIG. 10D illustrates the incremental effect of increasing Ω above 90° to 180°.

Figure 11C:
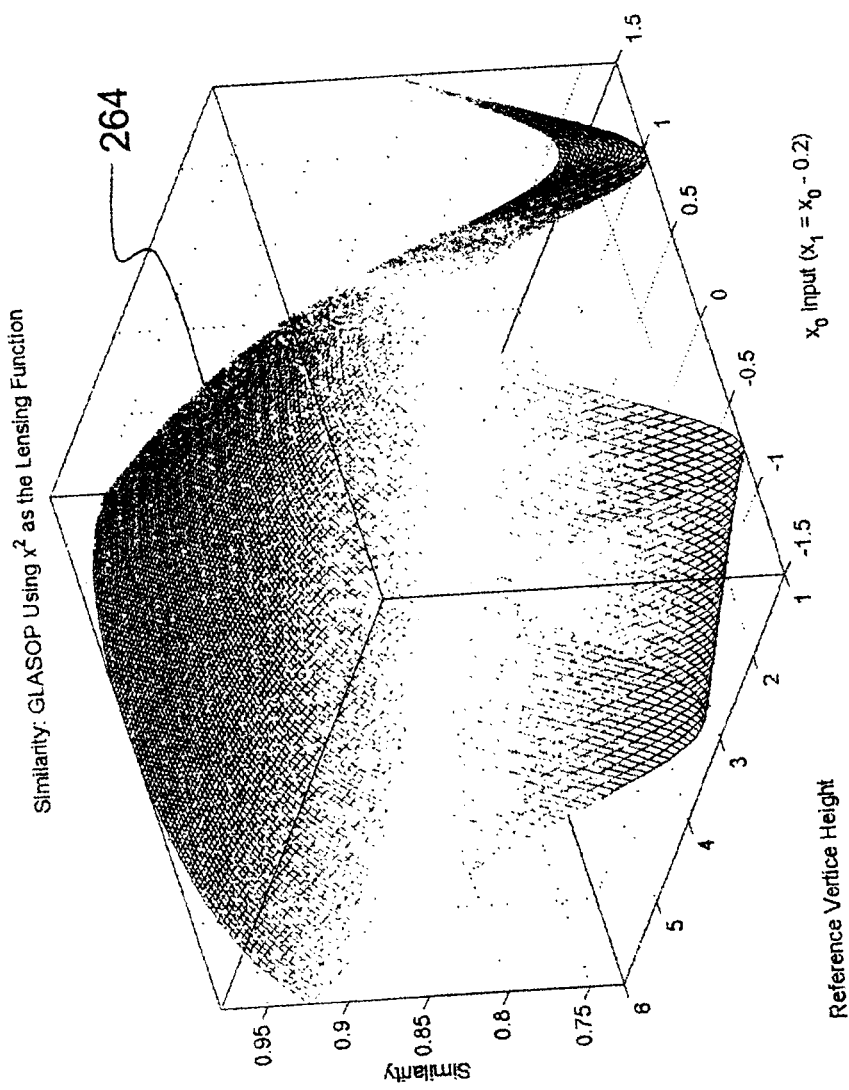
Figure 11D:
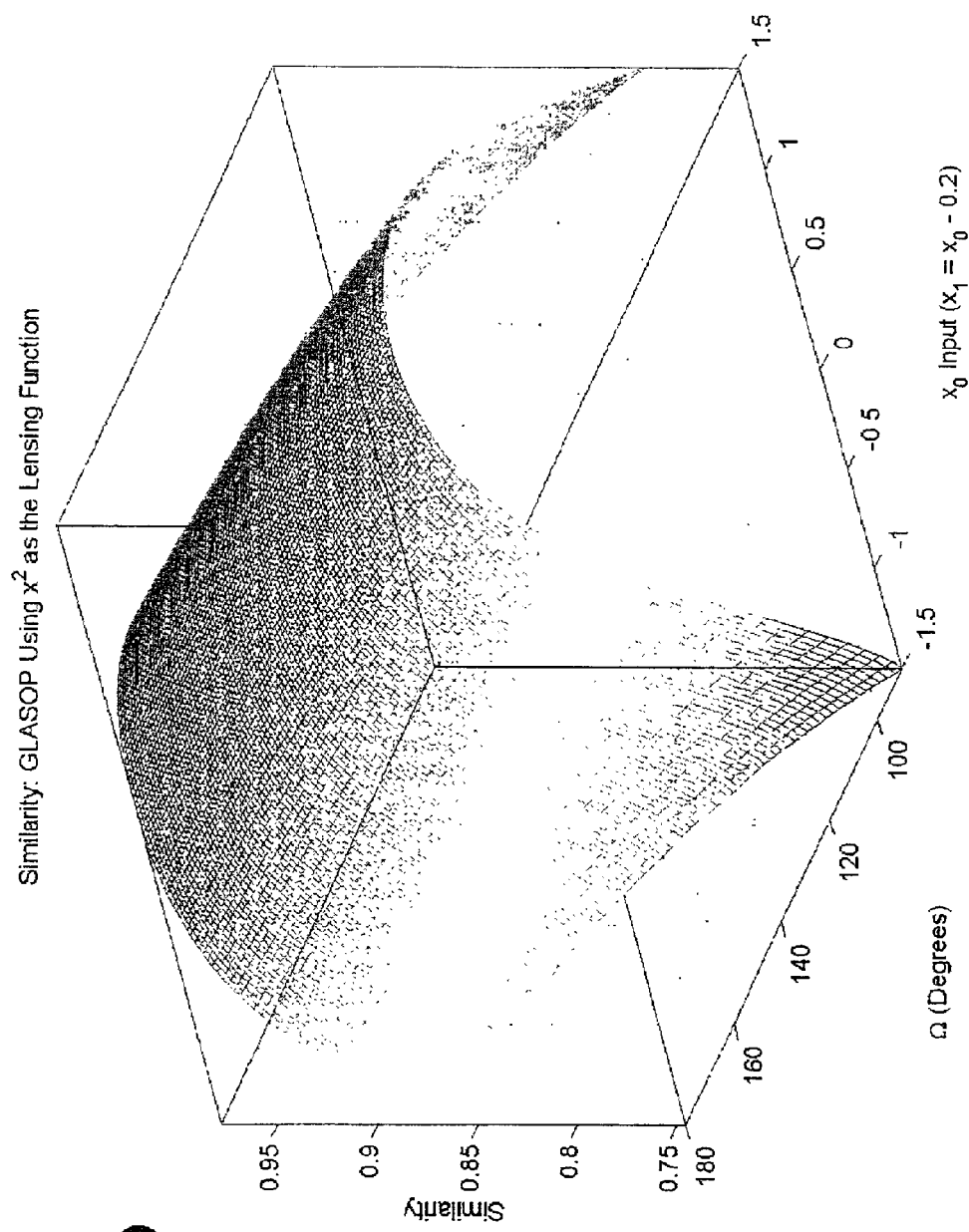
Figure 12C:
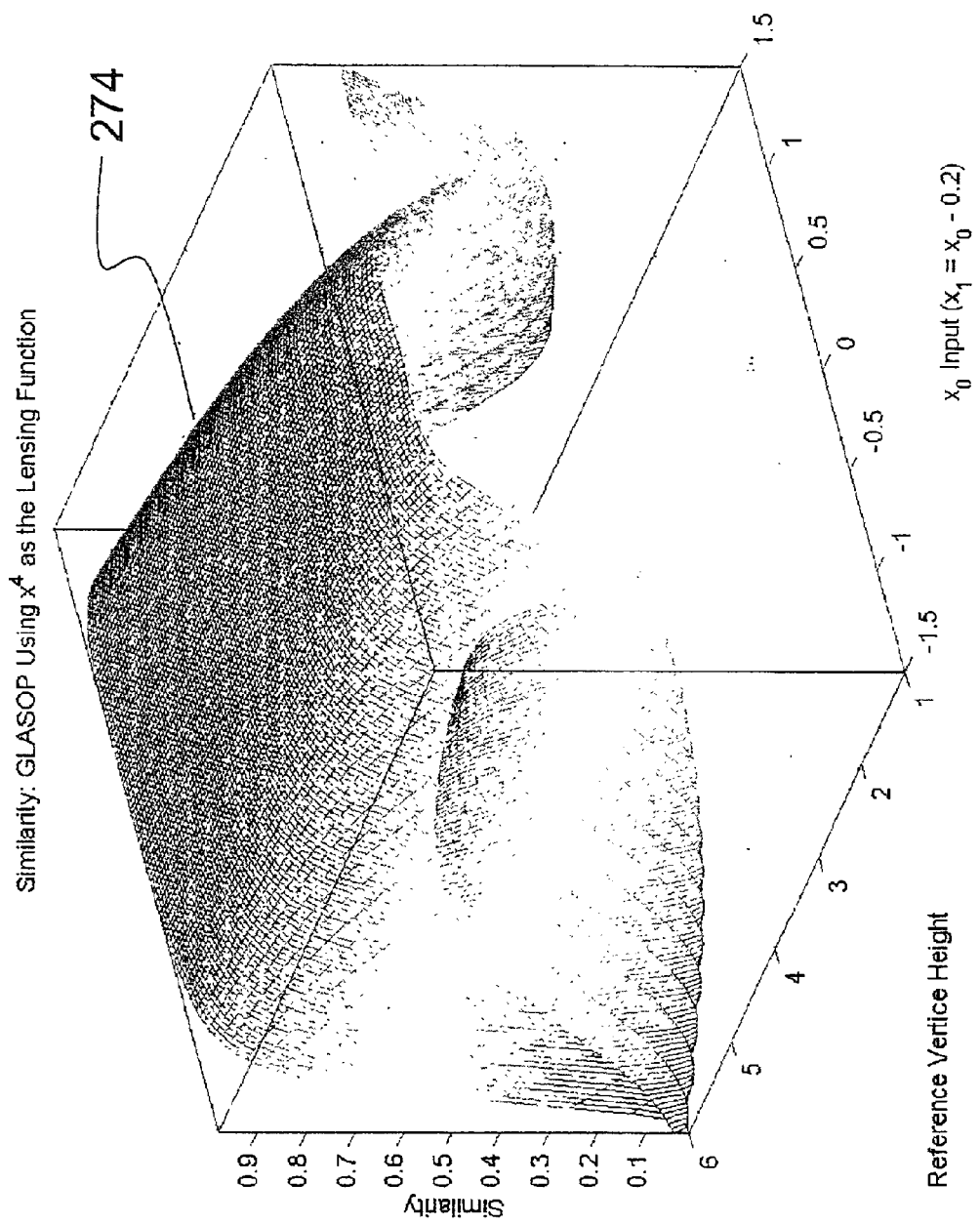
Figure 12D:
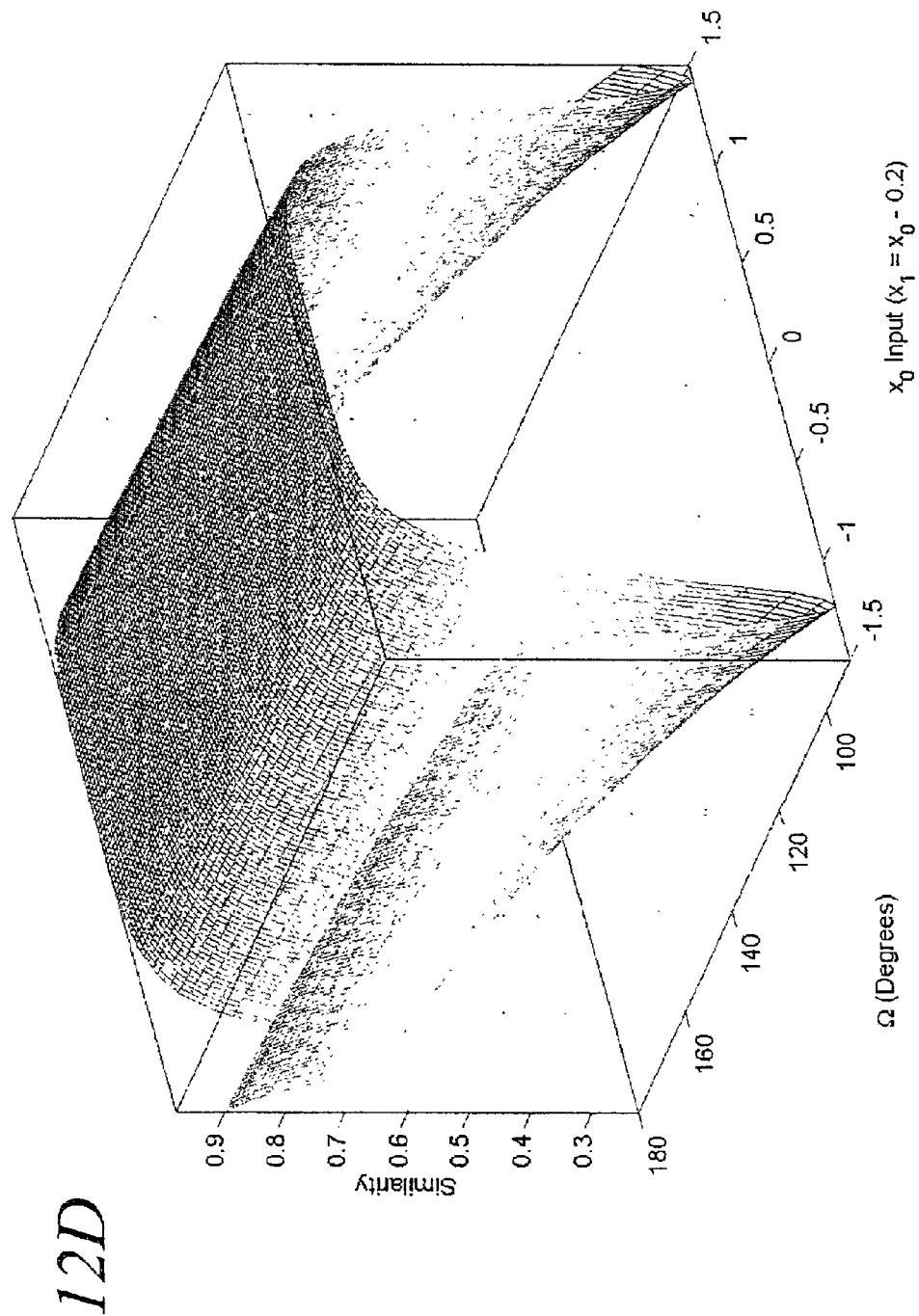

FIGS. 11A and 12A illustrate analogous curves 260, 270 formed using polynomial lensing functions of $x^2$ and $x^4$, respectively. FIGS. 11B–11C and 12B–12C illustrate the similarity value and the effect of a variation in vertex height corresponding to FIGS. 10B–10C. FIGS. 11D and 12D correspondingly illustrate variations in the Ω range above 90° to 180°.

Figure 14:
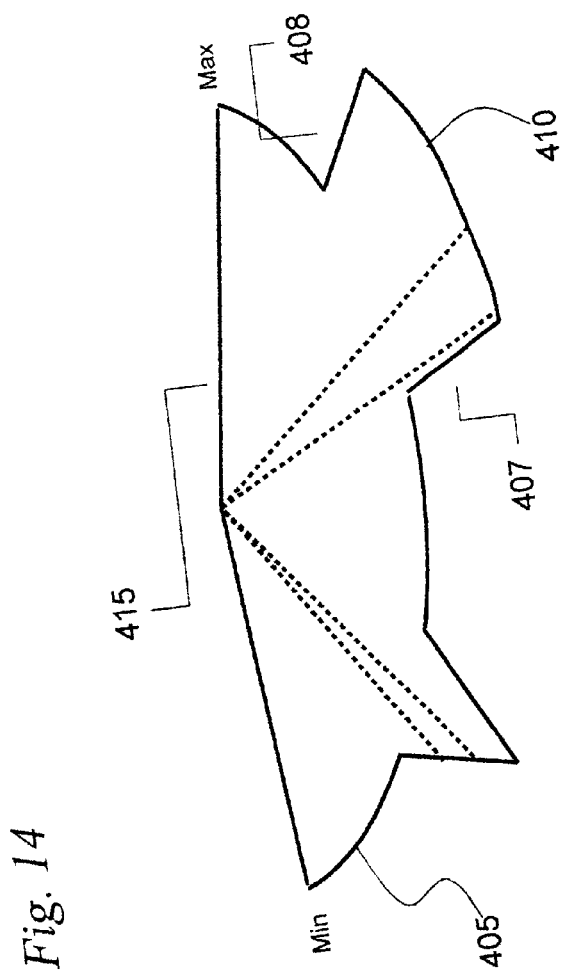
FIG. 14 is yet another embodiment of the similarity operator of the present invention showing discontinuous lensing effects.

Essentially, the similarity values are magnified, or lensed, when a pair of values falls along the similarity domain at a point where it is more orthogonal to the angle rays extending from the apex. The similarity values are diminished where the pair of values falls along the similarity domain at a point where it is more parallel to the rays from the apex. As can be seen, the lensing effect is further increased inversely with apex height, and distance of a portion of the similarity domain curve from the apex or vertex. According to the invention, different similarity curves can be empirically tested to determine which works best for a given sensor. The curve shapes can be numerical approximations (such as a lookup table of values) rather than equations for the curves. Thus, a similarity domain curve can be qualitatively generated by selecting various subranges of the expected range for a sensor to be more or less lensed. This can be done with the use of a smooth curve with the use of a spline technique to join curve segments together to provide the necessary lensing. Alternatively, turning to FIG. 14, the invention may also be accomplished with a discontinuous similarity domain line 405, such that a discontinuities 407 and 408 at the edges of a section 410 provide for a discrete jump in the distance from the vertex 415, and thus a discrete change in the angle, since a given arc length along domain line 405 will generate a smaller angle at a greater distance from the vertex 415.

Figure 13A:
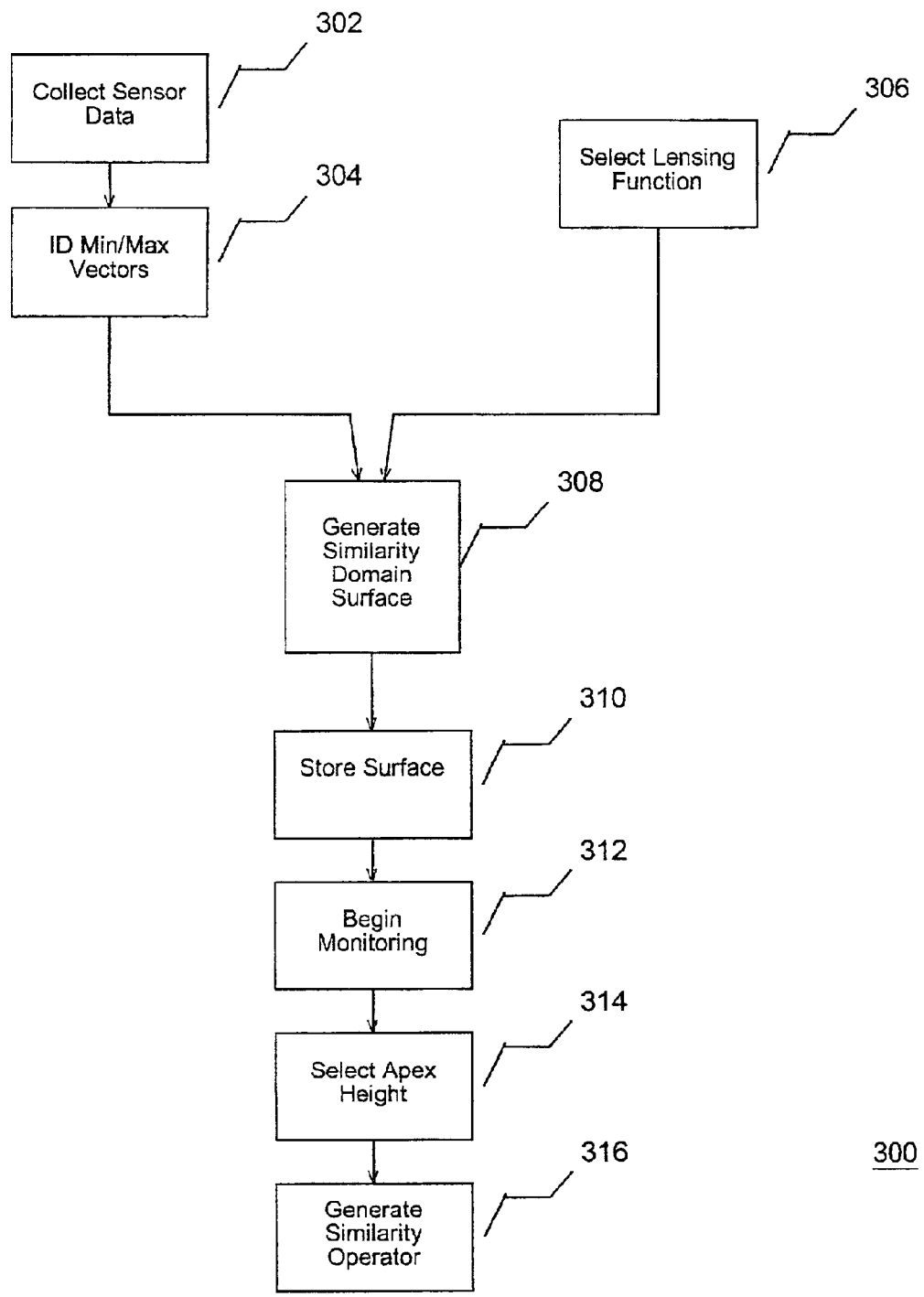
FIGS. 13A–13B are flow diagrams showing preferred methods of generating a generalized lensing Similarity Operator.

FIG. 13A is a flow diagram of a first preferred embodiment 300 for generating a lensing operator according to the present invention. First, in step 302 sensor data is collected as described hereinabove. Then in step 304 minimum and maximum vectors are identified for each parameter such as for example as is done in FIG. 6. Coincidentally, in step 306 a lensing function may be selected. Then, in step 308 using the min/max values provided in step 304 a Similarity Domain surface is generated based on the lensing function selected in step 306. Typically, the lensing surface is generated by identifying an origin with respect to the min and max values and then, generating curves to define the surface based on the origin and min/max values, each of the curves being generated with reference to a selected apex height. Then, any well known smoothing function may be applied to the curves to generate the surface. In step 310 the surface is stored for subsequent system monitoring which begins in step 312. For system monitoring, in step 314, an apex height is selected interactively. So, finally, in step 316 the Similarity Operator is generated from the apex height and throughout monitoring, different apex heights may be selected to vary the lensing and to vary the view provided to an operator monitoring system operation.

Figure 13B:
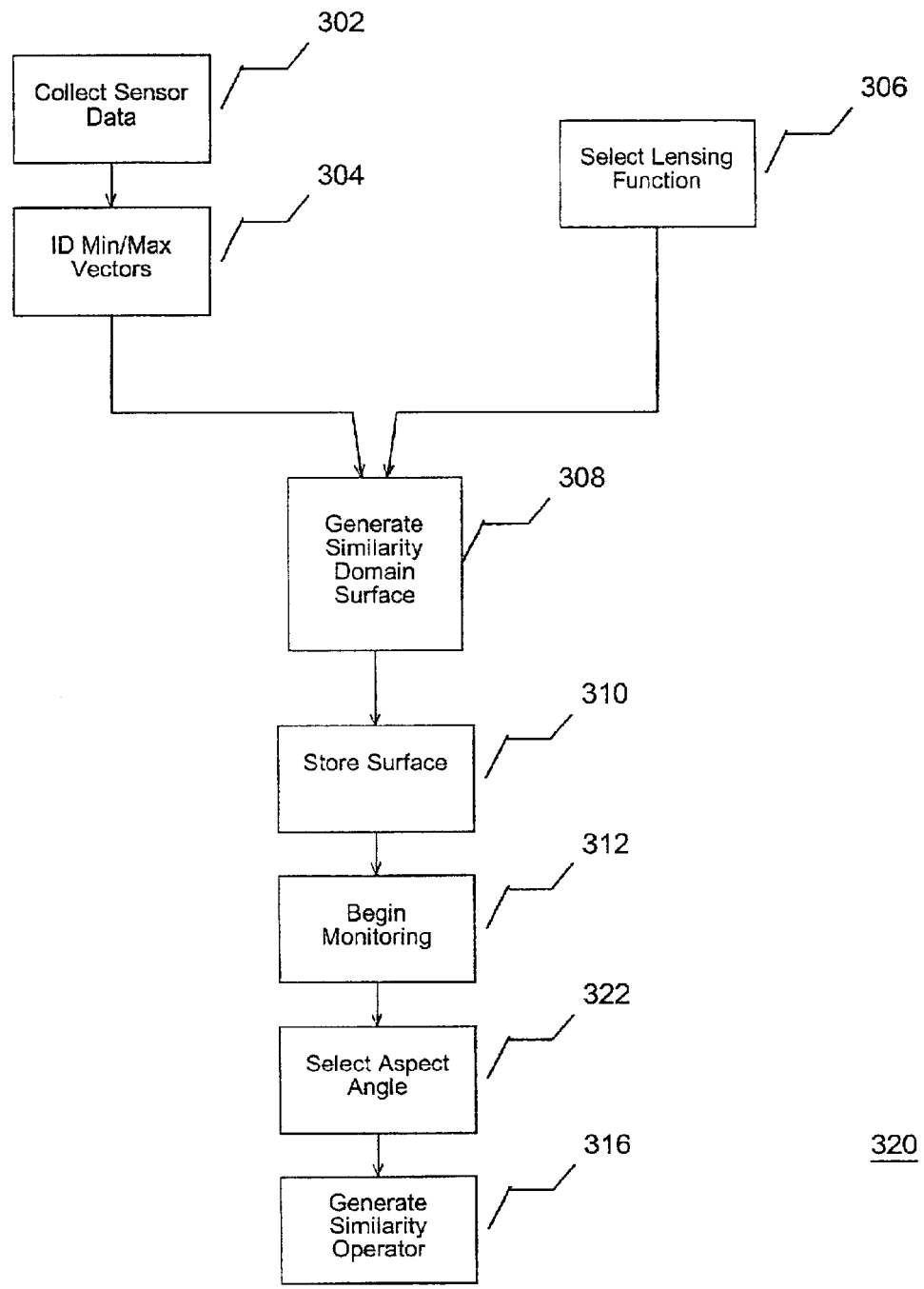

FIG. 13B shows an alternate embodiment 320 wherein instead of varying apex height, viewing angle is varied. All steps except step 322 are identical to those at FIG. 13A and so, are labeled identically. Thus, in step 322 the operator is allowed to select different viewing angles and in step 316 the view of system operation is provided based on that selected viewing angle. In both embodiments, snapshots are taken of the monitored system and compared against training set vectors using the selected lensing Similarity Operator to provide enhanced system modeling and to facilitate better understanding of the system's current operating state.

Thus, the advantage afforded by lensing is that focus can be directed to different regions of interest in a particular range for a given sensor, when performing a similarity determination between a current state vector and a prior known expected state vector. Using this similarity determination an estimated state vector can be computed for a real-time system that is being monitored and modeled using MSET or the like. The model performance can be honed for improved model estimates using the improved class of similarity operators of the present invention.

Further, the similarity operation of the present invention is rendered particularly non-linear and adaptive. The present invention can be used in system state classification, system state alarm notification, system virtual parameter generation, system component end of life determination and other techniques where an empirical model is useful. The present invention overcomes the above restrictions of the prior art methods by providing more flexibility to tweak and improve modeling fidelity.

It should be appreciated that a wide range of changes and modifications may be made to the embodiments of the invention as described herein. Thus, it is intended that the foregoing detailed description be regarded as illustrative rather than limiting and that the following claims, including all equivalents, are intended to define the scope of the invention.

What is claimed is:

1. A tool for monitoring system operation, said tool comprising:
    a data acquisition unit, said data acquisition unit receiving signals from sensors, said sensors being disposed upon a system being monitored and providing parametric snapshots of system operation;
    a memory storing a training set, said training set containing a plurality of system vectors, each of said system vectors being representative of an expected operating state of said system being monitored;
    a processor receiving snapshots from said data acquisition unit and comparing received snapshots with system vectors from said memory, said processor selectively applying a lensing similarity function to said comparison; and
    an output unit, said processor providing results of said comparison to said output unit, said processor comprising a similarity engine, said similarity engine receiving said snapshots from said acquisition unit and training set vectors from said memory and applying said lensing similarity function to said received vectors to generate a similarity vector, said similarity engine selectively providing said similarity vector to said output device.

2. A tool as in claim 1, said processor further comprising an estimated state generator receiving said similarity vector from said similarity engine and training vectors from said memory and generating an estimated state therefrom, said estimated state being selectively provided to said output device.

3. A tool as in claim 2, said processor further comprising a deviation detection engine, said deviation detection engine receiving snapshots from said data acquisition unit and estimated states from said estimated state generator and determining deviation therefrom, said deviation detection engine selectively providing said determined deviation to said output device.

4. A tool as in claim 3 wherein said lensing similarity function defines a similarity domain, vectors belonging to said training set falling on said similarity domain, snapshots being expected to fall within said similarity domain, each said snapshot's location within said similarity domain being a basis of said comparison by said processor.

5. A tool as in claim 4 wherein the lensing similarity function is representable as a line segment selected from the group consisting of a polynomial segment, an elliptical arc, a trigonometric segment and a circular arc, said line segment defining said similarity domain.

6. A tool as in claim 4 wherein said lensing similarity function comprises selecting a line segment from a non-planar surface, said line segment defining said similarity domain.

7. A tool as in claim 3 wherein the lensing similarity function comprises moving the comparison angle apex with respect to a similarity domain, vectors belonging to said training set falling on said similarity domain, snapshots being expected to fall within said similarity domain, each said snapshot's location within said similarity domain being a basis of said comparison by said processor.

8. A tool as in claim 3 wherein the lensing similarity function comprises extending a comparison angle range beyond 90°, rays from said comparison angle contacting outer limits of a similarity domain, vectors belonging to said training set falling on said similarity domain, snapshots being expected to fall within said similarity domain, each said snapshot's location within said similarity domain being a basis of said comparison.

9. A tool as in claim 3 wherein said monitored system is selected from the group consisting of a machine, a process and a biological system.

10. A method of generating a lensing function for a similarity operator for use in modeling operation of a system and monitoring said system during operation to determine if said system is performing within accepted parameters, a method comprising the steps of:
    a) collecting a plurality of system snapshots representative of normal system operation;
    b) identifying minimum and maximum vectors within said collected snapshots, said identified minimum and maximum vectors defining a training set for said system;
    c) selecting a lensing function, said lensing function allowing an operator to provide enhanced scrutiny to selected areas of operation;
    d) generating a similarity domain surface for each degree of said vectors in said training set using said lensing function; and
    e) storing said similarity domain surface.

11. A method as in claim 10, during monitoring of said system operation said method further comprising the steps of:
    f) selecting an apex height; and
    g) selecting a similarity operator line segment responsive to said selected apex height, vectors belonging to said training set falling on said similarity domain surface, snapshots being expected to fall within said similarity domain surface, each said snapshot's location within said similarity domain being a basis of said comparison by said processor.

12. A method as in claim 11, during monitoring of said system operation said method further comprising the steps of:
    f) selecting an aspect ratio; and
    g) selecting a similarity operator line segment responsive to said selected aspect ratio, vectors belonging to said training set falling on said similarity domain, snapshots being expected to fall within said similarity domain, each said snapshot's location within said similarity domain being a basis of said comparison by said processor.

13. A method as in claim 10 wherein said lensing function is an algebraically defined contour, said lensing function shaping said surface.

14. A method as in claim 10 wherein said lensing function is a sinusoidally defined contour, said lensing function shaping said surface.

15. A method as in claim 10 wherein said lensing function is a polar contour, said lensing function shaping said surface.

16. A method as in claim 10 wherein said monitored system is selected from the group consisting of a machine, a process and a biological system.

17. An apparatus for monitoring a system having monitored parameters, comprising:
   a memory for storing a plurality of reference snapshots of said parameters;
   an estimation engine disposed to receive a snapshot of parameter values representing a condition of said system, and generate a snapshot of at least one estimate of a parameter of said system, using a lensing similarity operator; and
   a differencing engine for determining a difference between said estimated snapshot and the received snapshot.

18. An apparatus according to claim 17 wherein said differencing engine successively differences said estimated parameter and a corresponding parameter value from said received snapshot to provide sequence of residual values, and performs a sequential probability ratio test on the sequence.

19. An apparatus according to claim 17 wherein said differencing engine successively differences said estimated parameter and a corresponding parameter value from said received snapshot and tests the resulting difference against a threshold.

20. An apparatus for monitoring a source of data for determining an operating state of a selected system, comprising:
   a first data source for providing reference data parameters characteristic of at least one operating state of a reference system;
   a second data source for providing selected data parameters from said source of data which are characteristic of an operating state of the selected system;
   a computer module operative to determine a measure of similarity between said selected data parameters of said selected system and said reference data parameters of said reference system, using a lensing similarity analysis wherein said computer module is operative to determine for each pair of corresponding parameters from said selected data parameters and said reference data parameters, a length along a selected curve proportional to the difference of such pair of corresponding parameters, and an angle formed by lines drawn from the ends of the length to a selected vertex, and generate a similarity value for such corresponding pair based on said angle.

21. An apparatus for monitoring a source of data for determining an operating state of a selected system, comprising:
   a first data source for providing reference data parameters characteristic of at least one operating state of a reference system;
   a second data source for providing selected data parameters from said source of data which are characteristic of an operating state of the selected system;
   a computer module operative to determine a measure of similarity between said selected data parameters of said selected system and said reference data parameters of said reference system, using a lensing similarity analysis, wherein said computer module is operative to determine for each pair of corresponding parameters from said selected data parameters and said reference data parameters, a length along a selected curve as a function of a length along an ordinate axis to said curve proportional to the difference of such pair of corresponding parameters, and an angle formed by lines drawn from the ends of the length along said curve to a selected vertex, and generate a similarity value for such corresponding pair based on said angle.

* * * * *